(12) United States Patent
Konakawa et al.

(10) Patent No.: US 8,336,517 B2
(45) Date of Patent: Dec. 25, 2012

(54) OUTBOARD MOTOR

(75) Inventors: Tsugunori Konakawa, Shizuoka (JP);
Yusuke Takahashi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 623 days.

(21) Appl. No.: 12/548,671

(22) Filed: Aug. 27, 2009

(65) Prior Publication Data
US 2010/0059008 A1 Mar. 11, 2010

(30) Foreign Application Priority Data
Sep. 8, 2008 (JP) ................................. 2008-229389

(51) Int. Cl.
*F02B 77/04* (2006.01)
(52) U.S. Cl. ................ 123/198 E; 123/195 C; 440/88 A
(58) Field of Classification Search .............. 123/195 C, 123/184.48, 195 P, 198 E, 572, 573; 440/88 A
See application file for complete search history.

(56) References Cited

U.S. PATENT DOCUMENTS

| | | | | |
|---|---|---|---|---|
| 2,676,559 A * | 4/1954 | Davies | ............................. | 440/53 |
| 2,756,736 A * | 7/1956 | Kiekhaefer | ............... | 123/198 E |
| 3,195,521 A * | 7/1965 | Larsen | ....................... | 123/41.47 |
| 3,358,668 A * | 12/1967 | Post et al. | ................. | 123/198 E |
| 4,348,194 A * | 9/1982 | Walsh | ............................. | 440/77 |
| 4,692,123 A * | 9/1987 | Tada et al. | ....................... | 440/77 |
| 4,721,485 A * | 1/1988 | Suzuki | ............................ | 440/77 |
| 5,806,311 A | 9/1998 | Okamoto | | |
| 6,055,946 A * | 5/2000 | Dombek et al. | ........... | 123/41.11 |

* cited by examiner

*Primary Examiner* — Noah Kamen
*Assistant Examiner* — Hung Q Nguyen
(74) *Attorney, Agent, or Firm* — Keating & Bennett, LLP

(57) ABSTRACT

An outboard motor includes an engine, an engine cover, a partitioning member, an intake device, and a fan. The engine is arranged to support a crankshaft extending along an up-down direction. The partitioning member is arranged to partition the inside of the engine cover into a lower chamber accommodating the engine and an upper chamber. In the partitioning member, a communication hole which is arranged to cause the upper chamber to communicate with the lower chamber is provided. Also, the engine cover has an air inlet arranged to cause the upper chamber to communicate with the atmosphere, and an air outlet arranged to cause the lower chamber to communicate with the atmosphere. The air inlet is arranged in an upper portion of the engine cover. The air outlet is arranged at a lower end portion of the engine cover. The intake device is connected to the engine. The intake device has an air suction port arranged to communicate with the upper chamber. The fan is arranged inside the engine cover. The fan is arranged to send air inside the upper chamber into the lower chamber through the communication hole.

14 Claims, 23 Drawing Sheets

OUTBOARD MOTOR

BACKGROUND OF THE INVENTION

1. Field of the Invention

The present invention relates to an outboard motor including an engine cover arranged to cover an engine.

2. Description of Related Art

An outboard motor according to a prior art is described in U.S. Pat. No. 5,806,311. This outboard motor includes an engine which is arranged to support a crankshaft extending along an up-down direction, and an engine cover covering the engine. Also, the outboard motor is arranged to prevent water which entered the inside of the engine cover from being suctioned into the engine together with air. In detail, the outboard motor is arranged to separate water from air by using a narrow space between the engine cover and the engine.

In the space between the engine cover and the engine, an air passage in which intake air flows is provided. This air passage is arranged like a maze by outer walls of the engine and members such as an auxiliary machine installed in the outboard motor. Water which entered the inside of the engine cover flows into the maze-like passage together with air suctioned by the engine. Then, when air flows inside this passage while turning in direction, water contained in the air is separated. Also, the engine and other heating components installed in the outboard motor are cooled by the air flowing between the engine cover and the engine.

SUMMARY OF THE INVENTION

The inventor of preferred embodiments of the invention described and claimed in the present application conducted an extensive study and research regarding the design and development of an outboard motor, and in doing so, discovered and first recognized new unique challenges and problems created by the interplay and trade-off relationships of the combination of various problems with outboard motors. In view of the inventor's discovery of these new unique challenges and problems, the inventor further discovered and developed the preferred embodiments of the present invention, described in greater detail below, to provide unique solutions to previously unrecognized and unsolved problems.

More specifically, in the above-described outboard motor, the outer walls of the engine and components around the engine are cooled by air. However, the engine suctions air at a temperature which has increased. Therefore, a problem occurs in which a filling efficiency of the air to be suctioned into the engine becomes low and the output of the engine lowers. Further, the intake air temperature increases, and therefore, knocking easily occurs.

If knocking occurs frequently, a shock wave occurring inside the combustion chamber along with knocking breaks films of gas (boundary layers) on the surfaces inside the cylinder. If the films of gas are broken, flames of combustion come into direct contact with the metal surfaces inside the cylinder (the cylinder inner peripheral surface, the piston top surface, and the cylinder head surface, etc.).

The metal surfaces are easily melted by heat when they are directly exposed to the flame. When the metal surfaces are melted, this finally results in breakage of the engine.

If the ignition timing of the engine is delayed to suppress an occurrence of knocking, the torque of the engine lowers, and the temperature of exhaust gas increases. When the exhaust system includes a catalyst, the temperature of the catalyst may excessively increase along with the increase in exhaust gas temperature.

It is known that if the catalyst is continuously exposed to an excessively high temperature, the catalyst is deteriorated by a so-called sintering phenomenon, and the purification efficiency is deteriorated. The sintering phenomenon is a phenomenon in which the catalyst is held at a high temperature not less than about 850° C. for a long period, as a result, noble metals in the catalyst thermally adhere to each other and the surface areas of the noble metals in the catalyst are reduced.

Thus, the inventor discovered and carefully studied the many varying problems described above, and recognized certain unique and unsolved interrelationships and trade-offs, and the effects of various unique solutions on such diverse and numerous problems. After diligent research and work on such unique problems and novel potential solutions, the preferred embodiments of the present invention were discovered and developed.

A preferred embodiment of the present invention provides an outboard motor including an engine, an engine cover, a partitioning member, an intake device, and a fan. The engine is arranged to support a crankshaft extending along an up-down direction. The engine cover is arranged to cover the engine. The partitioning member is arranged to partition the inside of the engine cover into a lower chamber accommodating the engine and an upper chamber. In the partitioning member, a communication hole which is arranged to cause the upper chamber to communicate with the lower chamber is provided. Also, the engine cover has an air inlet arranged to cause the upper chamber to communicate with the atmosphere, and an air outlet arranged to cause the lower chamber to communicate with the atmosphere. The air inlet is arranged in an upper portion of the engine cover. The air outlet is arranged at a lower end portion of the engine cover. The intake device is connected to the engine. The intake device has an air suction port arranged to communicate with the upper chamber. The fan is arranged inside the engine cover. Also, the fan is arranged to send air inside the upper chamber into the lower chamber through the communication hole.

The partitioning member may partition the inside of the engine cover substantially horizontally. Alternatively, the partitioning member may partition the inside of the engine cover diagonally to the horizontal.

With the above-described configuration, the engine is accommodated in the lower chamber. Therefore, heat of the engine is blocked by the partitioning member and this makes it difficult for heat to be transmitted to the upper chamber. Therefore, an increase in temperature of air inside the upper chamber is suppressed or prevented. Therefore, the temperature of the air inside the upper chamber suctioned from the air suction port is kept equivalent to the temperature of the atmosphere (the air outside the engine cover).

Air inside the upper chamber is supplied to the engine by the intake device. Therefore, air at a temperature equivalent to that of the atmosphere is supplied to the engine by the intake device. In other words, the temperature of intake air of the engine becomes equivalent to the temperature of the atmosphere.

On the other hand, a portion of the air inside the upper chamber is sent into the lower chamber by the fan. The air sent into the lower chamber is kept at a temperature equivalent to the temperature of the atmosphere. Also, the air sent into the lower chamber flows around the engine toward the air outlet. Accordingly, the engine and heating components such as electronic components provided in the lower chamber are efficiently cooled by the air.

Inside the upper chamber, water may enter from the air inlet. The fan sends water in the form of mist floating inside the upper chamber out of water, into the lower chamber together with air. Therefore, a portion of water which entered the upper chamber can be discharged downward by the fan. Therefore, water to be suctioned by the intake device can be reduced.

Thus, in the present preferred embodiment of the present invention, the temperature of intake air of the engine can be lowered. Further, components accommodated in the lower chamber such as the engine can be efficiently cooled. Further, water to be suctioned by the intake device can be reduced. Therefore, an outboard motor which can lower the intake air temperature, cool the engine, and reduce an amount of water to be suctioned by the intake device can be provided.

The lower chamber may be arranged so as to be kept at a positive pressure higher than the atmospheric pressure when the fan is actuated.

Also, the intake device may include an intake passage which is provided inside the engine cover and causes the engine to communicate with the air suction port. Preferably, this intake passage is not arranged to communicate with the lower chamber.

An opening area of the air outlet may be smaller than an opening area of the communication hole. For example, when the air outlet includes a plurality of holes, a sum of opening areas of the plurality of holes constituting the air outlet may be smaller than the opening area of the communication hole.

The intake device may include an intake duct which preferably has a U-shaped or substantially U-shaped configuration in a side view and distributes air suctioned from the air suction port to the engine. In this case, the intake duct may include a pair of upper end portions positioned at an upper portion of the inside of the engine cover, and a bottom portion positioned at a lower portion of the inside of the engine cover. Also, inside the intake duct, a fuel supply float chamber may be provided.

A suction passage may be connected to the lowest portion of the intake duct via a check valve. A suck-out port may be arranged to communicate with the suction passage. Also, the suck-out port may be arranged at a position at which a suctioning force acts when a marine vessel including the outboard motor runs. For example, when the outboard motor includes a propeller which is arranged to generate a propulsive force, the suck-out port may be arranged at a position at which a negative pressure lower than the atmospheric pressure is generated due to a water current by rotation of the propeller.

Also, the outboard motor may further include a solenoid clutch which selectively transmits rotation of the crankshaft to the fan.

Also, the outboard motor may further include a communication duct which is arranged to project upward from the partitioning member and has an opening provided at an upper end of the communication duct. The opening at the upper end of the communication duct may be arranged higher than the air inlet.

Also, the outboard motor may further include a protrusion which is positioned between the communication duct and the air inlet and is arranged to protrude upward from the partitioning member. This protrusion may be arranged near the communication duct.

Also, the partitioning member may include a slope portion which is arranged to slope so as to lead water entering the upper chamber to the air inlet.

Also, the air suction port may be arranged at a position higher than the engine inside the engine cover.

Other elements, features, steps, characteristics, and advantages of the present invention will become more apparent from the following detailed description of the preferred embodiments with reference to the attached drawings.

BRIEF DESCRIPTION OF THE DRAWINGS

FIG. 22A is a side view showing a state in which the top cover is closed, drawn in a state in which the top cover is cut-away. FIG. 22B is a longitudinal sectional view showing a state in which the top cover is opened, along XXIIB-XXIIB of FIG. 21.

DETAILED DESCRIPTION OF THE PREFERRED EMBODIMENTS

Hereinafter, an outboard motor 1 according to preferred embodiments of the present invention will be described in detail with reference to FIG. 1 to FIG. 28.

Figure 1:
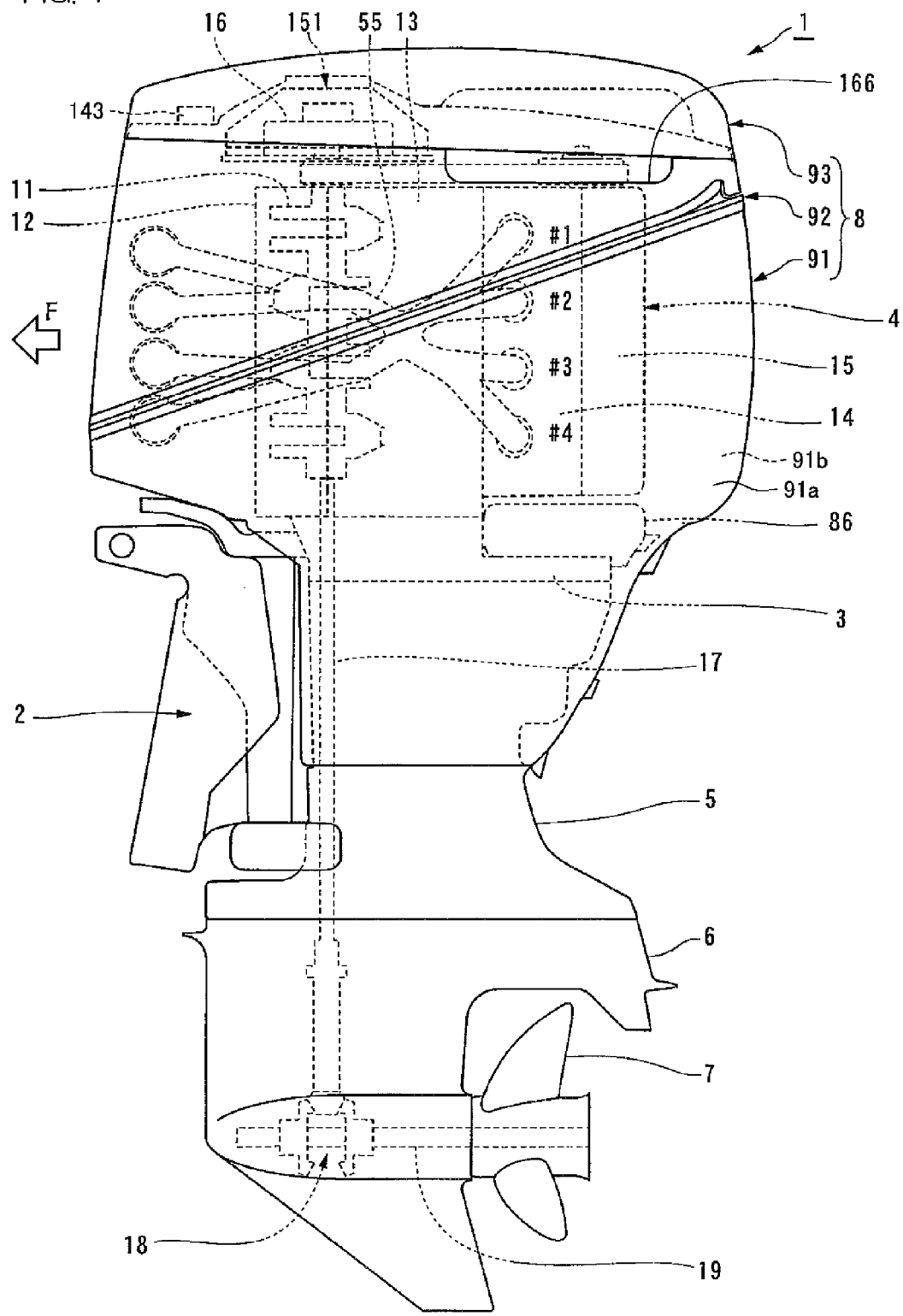
FIG. 1 is a side view of an outboard motor of a preferred embodiment of the present invention.

The outboard motor 1 as shown in FIG. 1 is to be attached to a transom board of a hull (not shown) so as to be steered and tilted via a bracket 2. Therefore, the outboard motor 1 can be in various postures with respect to the hull in an actual use state; however, in this specification, for the sake of convenience, based on a predetermined reference posture of the outboard motor 1, up-down, left-right, and front-rear directions are defined. The reference posture is a posture of the outboard motor 1 at a steering angle of zero and a tilt angle of zero with respect to the hull in the horizontal posture. In this condition, when a propulsive force in the forward drive direction is generated from the outboard motor 1, the hull moves straight ahead. In other words, in this specification, as expressions of directions of the outboard motor 1 and the respective members, the heading direction of a hull when it moves ahead, that is, when it moves straight ahead is simply referred to as the front of the outboard motor 1, and the side 180 degrees opposite to the front is referred to as the rear side. In addition, the left side of the hull with respect to the heading direction of the hull when the hull moves ahead is referred to as the outboard motor left side or the left side simply, the right side of the hull with respect to the heading direction when the hull moves ahead is referred to as the outboard motor right side or the right side simply. Further, the left-right direction of the outboard motor 1 when the hull moves ahead is referred to as the left-right direction of the outboard motor 1. Also, in the drawings, an arrow F indicating the forward side of the outboard motor 1 is shown as is appropriate.

FIG. 1 is a side view of the outboard motor 1 of a preferred embodiment of the present invention. The outboard motor 1 includes an engine support member 3, an engine 4, an upper casing 5, a lower casing 6, a propeller 7, and an engine cover 8. The engine support member 3 is a plate-shaped member joined to the upper end of a bracket 2. On the engine support member 3, the engine 4 is mounted. In addition, the upper casing 5 is attached to the lower portion of the engine support member 3. The lower casing 6 is attached to the lower end of the upper casing 5. The propeller 7 is rotatably supported on the lower casing 6. The engine cover 8 covers the engine 4.

The engine 4 preferably is a four-cycle four-cylinder engine in this preferred embodiment. The engine 4 is mounted on the engine support member 3 in a posture in which the axis line of the crankshaft 11 extends along the up-down direction. Four cylinders of the engine 4 are positioned behind the crankshaft 11 (opposite side of the hull with respect to the crankshaft 11), and are aligned in series along the up-down direction. In the present preferred embodiment, among the four cylinders of the engine 4, the highest cylinder is referred to as a first cylinder #1, and cylinders below the first cylinder #1 are referred to as, in order from the top, a second cylinder #2, a third cylinder #3, and a fourth cylinder #4. In the engine 4, the first cylinder #1, the third cylinder #3, the fourth cylinder #4, and the second cylinder #2 are ignited in this order, for example.

The crankshaft 11 is arranged so as to penetrate through the engine 4 in the up-down direction. At an upper end portion of the crankshaft 11, a flywheel magneto 16 is provided. A drive shaft 17 is coupled to the lower end of the crankshaft 11. The drive shaft 17 extends along the up-down direction from the lower end of the engine 4 to the inside of the lower casing 6. The drive shaft 17 is supported rotatably onto the engine support member 3, the upper casing 5 and the lower casing 6 via bearings (not shown). The lower end of the drive shaft 17 is coupled to a propeller shaft 19 via a forward-reverse switching mechanism 18. The propeller 7 rotates integrally with the propeller shaft 19.

Figure 2:
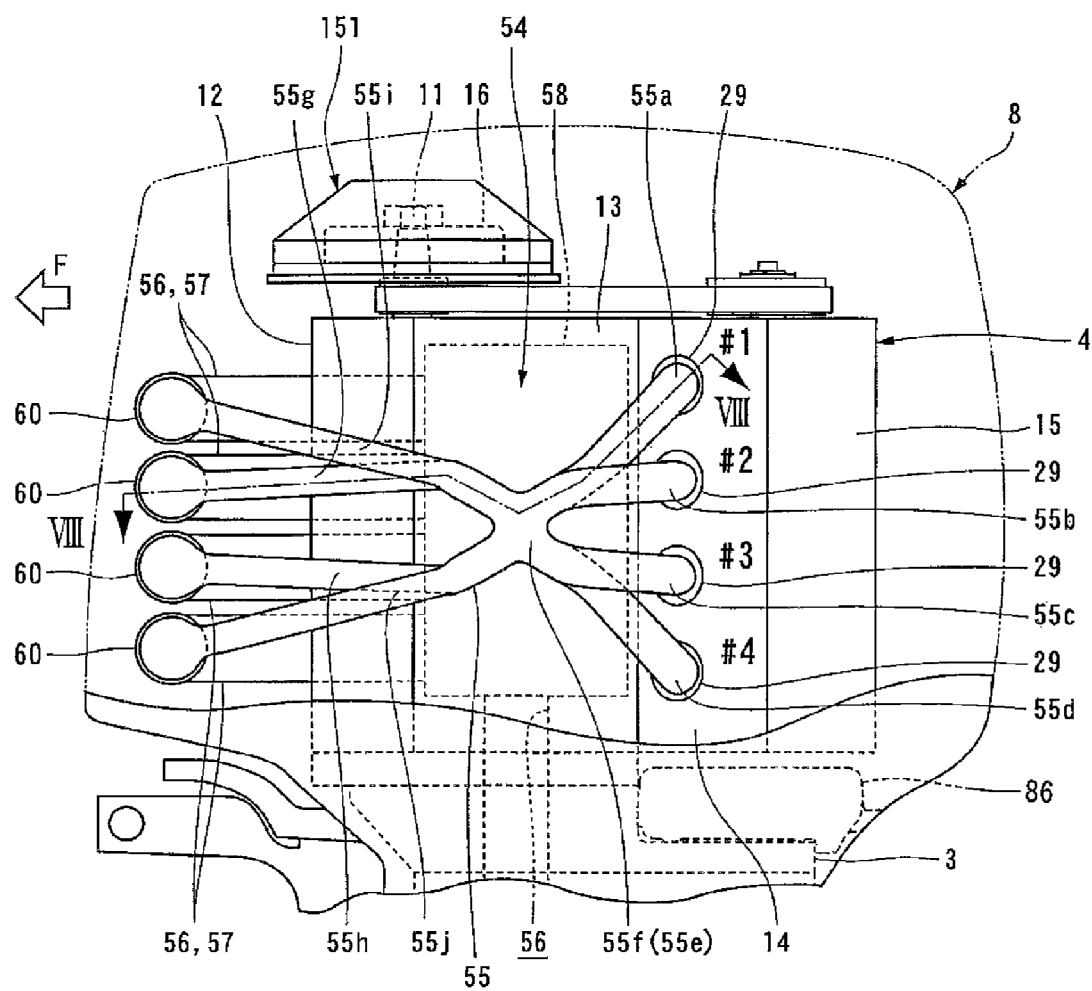
FIG. 2 is an enlarged side view of an engine section of the outboard motor.
Figure 3:
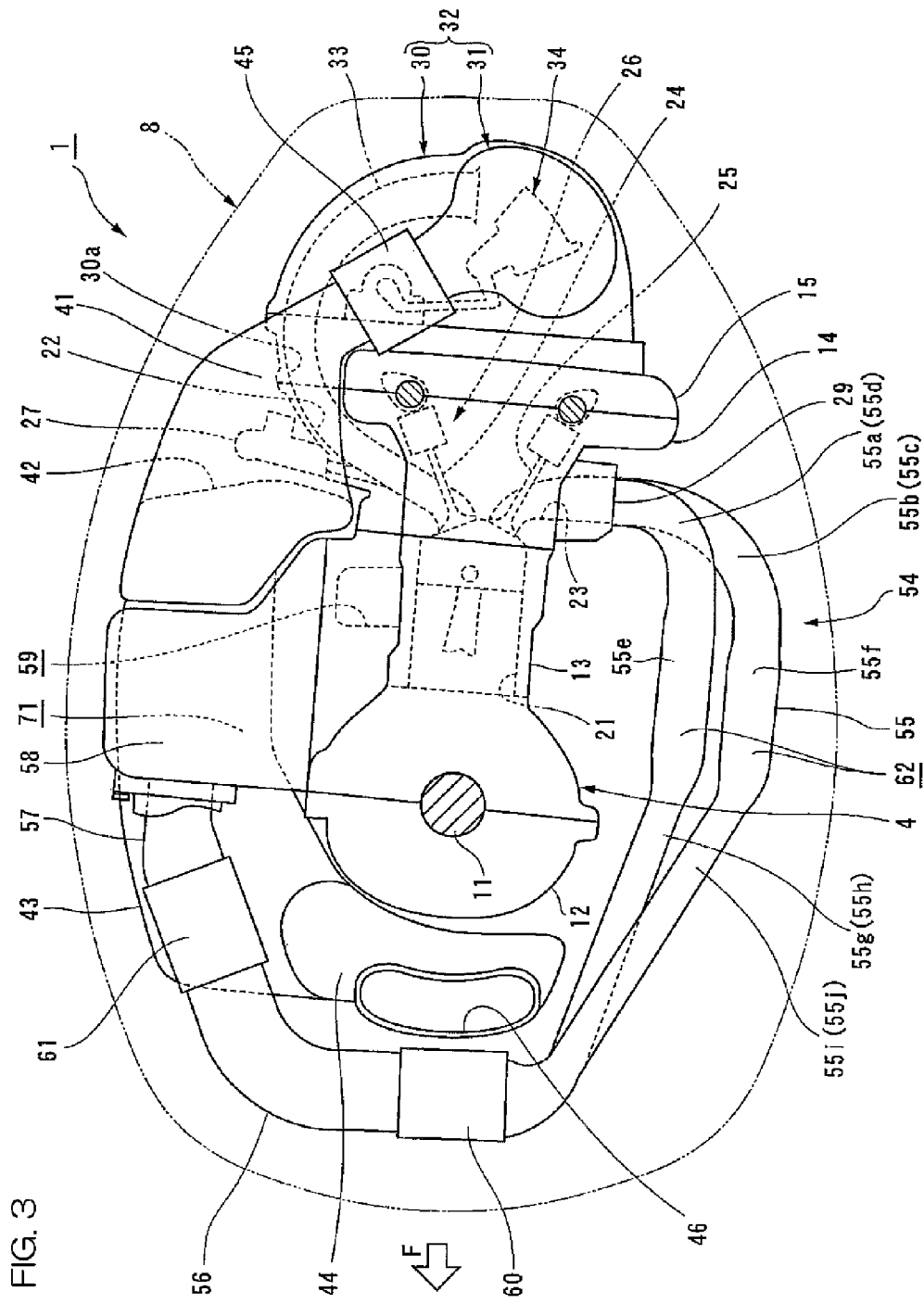
FIG. 3 is an enlarged plan view of the engine section of the outboard motor.

FIG. 2 is an enlarged side view of the engine portion, and FIG. 3 is an enlarged plan view of the engine portion. In FIG. 2 and FIG. 3, a portion of or an entire external shape of the engine cover 8 is indicated by a phantom line.

The engine 4 includes a crank case 12, a cylinder body 13, a cylinder head 14, and a head cover 15. The crank case 12 and the cylinder body 13 rotatably support the crankshaft 11. The cylinder head 14 is attached to the cylinder body 13. The head cover 15 is attached to the cylinder head 14. The crank case 12, the cylinder body 13, the cylinder head 14, and the head cover 15 are arranged in the front-rear direction of the outboard motor 1 in this order from the forward side of the outboard motor 1. In addition, the crank case 12, the cylinder body 13, the cylinder head 14, and the head cover 15 are mounted on the engine support member 3, respectively.

In the cylinder body 13, cylinders 21 (see FIG. 3) constituting first cylinder #1 to fourth cylinder #4 are provided and lined up in the up-down direction. As shown in FIG. 3, in the cylinder head 14, an intake port 22 and an exhaust port 23 are preferably provided for each of the cylinders. Further, the cylinder head 14 is provided with intake valves 24 and an exhaust valves 25 arranged to open and close these ports 22 and 23, respectively. The cylinder head 14 is further provided with a valve operating device 26 arranged to drive the intake valves 24 and exhaust valves 25 and an injector 27 for each cylinder arranged to inject fuel into the corresponding intake port 22.

The intake ports 22 are provided at the side portion on the outboard motor right side of the cylinder head 14, that is, at the side portion on the opposite side of the exhaust ports 23 with respect to the left-right direction of the outboard motor 1 as shown in FIG. 3. The intake ports 22 extend toward the outboard motor rear side, that is, toward the head cover 15 side, so as to separate from the crank case 12. Inlet ends of the intake ports 22 are connected to an intake device 32 including an intake surge tank 30 and an intake duct 31.

In detail, the intake surge tank 30 is arranged rearward of the head cover 15. Inside the intake surge tank 30, intake pipes 33 are accommodated. The inlet ends of the intake ports 22 are connected to corresponding intake pipes 33. The intake surge tank 30 is arranged at the rear end of the engine 4. The rear end of the engine 4 is an end on the opposite side of the crank case 12 in a plan view.

The exhaust ports 23 open on the outer portion (side portion on the outboard motor left side) in the left-right direction of the outboard motor 1 of the cylinder head 14, and are connected to an exhaust device 54 as shown in FIG. 3. The openings of the exhaust ports 23 define exhaust gas outlets 29.

As shown in FIG. 3, the exhaust device 54 includes a first exhaust pipe 55, a second exhaust pipe 56, a third exhaust pipe 57, an exhaust chamber 58, and a main exhaust passage 59. An upstream end of the first exhaust pipe 55 is connected to the exhaust gas outlets 29. The second exhaust pipe 56 is connected to a downstream end of the first exhaust pipe 55. The third exhaust pipe 57 is connected to a downstream end of the second exhaust pipe 56. The exhaust chamber 58 is connected to a downstream end of the third exhaust pipe 57. The main exhaust passage 59 is arranged so as to extend downward from a downstream end portion of the exhaust chamber 58.

In the present preferred embodiment of the present invention, the first exhaust passage 62 is preferably defined by spaces inside the first to third exhaust pipes 55 to 57, a space inside the exhaust chamber 58, and the main exhaust passage 59. FIG. 2 and FIG. 3 are drawn such that only an external form of the insides of the first to third exhaust pipes 55 to 57 (corresponding to a portion of the first exhaust passage 62) is shown.

Figure 4:
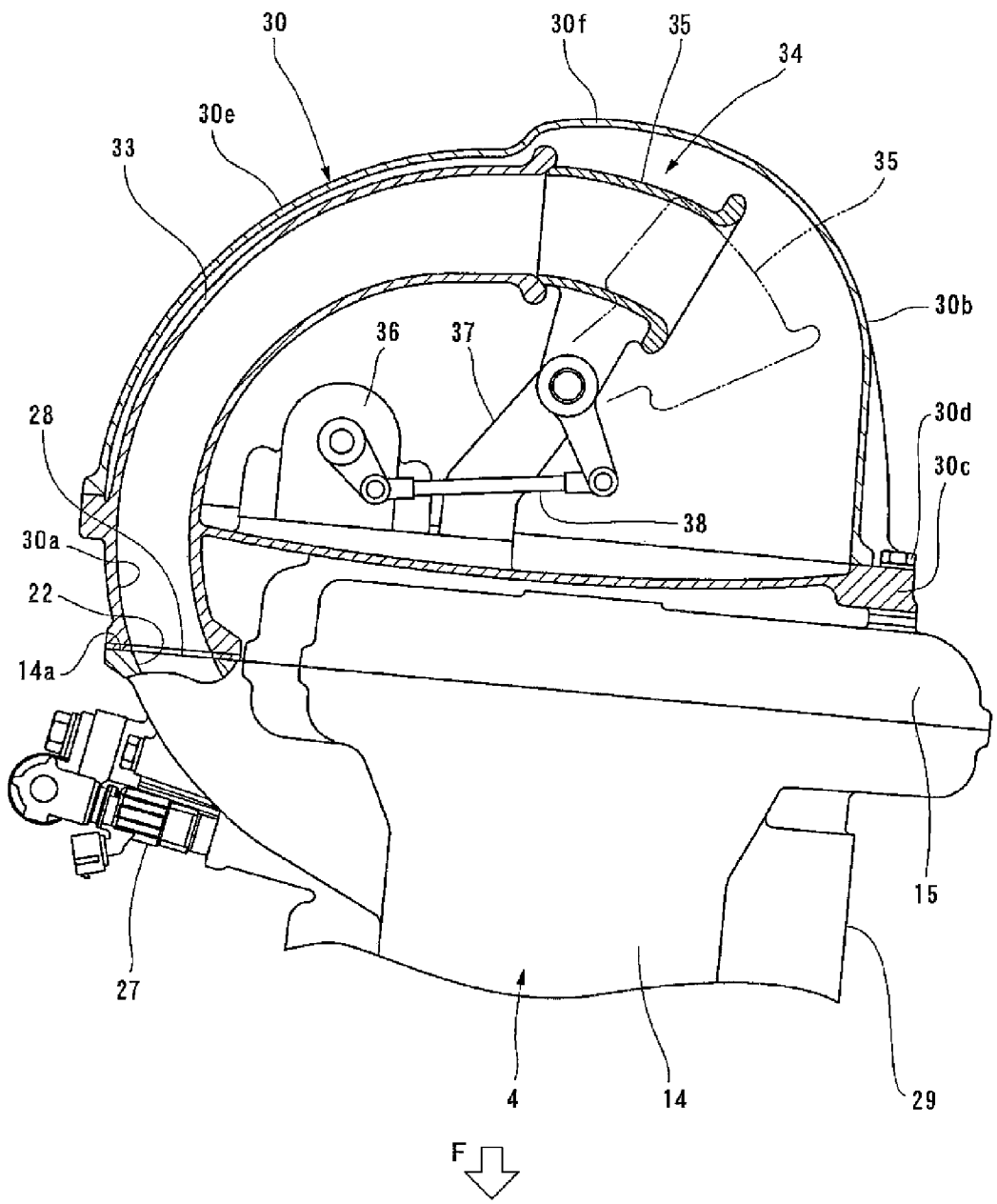
FIG. 4 is a sectional view of an intake surge tank section.

FIG. 4 is a sectional view for describing a configuration relating to the intake surge tank 30. The inlet ends of the intake ports 22 open on the end on the outboard motor right side of the rear surface 14a of the cylinder head 14 (a surface to which the head cover 15 is connected). The openings of the inlet ends of the intake ports 22 define intake inlets 28 of the engine 4. The intake inlets 28 are arranged on the opposite sides of the exhaust gas outlets 29 in the left-right direction of the outboard motor 1. The intake inlets 28 are connected to intake holes 30a of the intake surge tank 30 attached to the rear surface 14a of the cylinder head 14. The intake holes 30a are connected to the respective intake pipes 33.

The intake surge tank 30 has a box-shaped intake surge tank main body 30b opening toward the front of the outboard motor 1 (head cover 15 side), and an attaching member 30c which closes the opening portion of the intake surge tank main body 30b. The intake surge tank 30 is attached to the head cover 15 with attaching bolts 30d, for example.

The intake pipes 33 are arranged so as to extend while curving in an arc shape in a plan view. In detail, the intake pipes 33 curve so as to project to the rear side (upper side in FIG. 4) of the outboard motor 1, that is, in the opposite direction of the crank case 12 with respect to the cylinder head 14 from the intake inlets 28. Also, the intake pipes 33 curve so as to project to the left side (right side in FIG. 4) of the outboard motor 1, that is, come closer to the exhaust ports 23 (see FIG. 3) in the left-right direction of the outboard motor 1. The intake pipes 33 are extended along the side wall 30e on the outboard motor right side and the rear wall 30f of the suction surge tank main body 30b inside the intake surge tank 30. The intake pipes 33 open within an end portion on the outboard motor rear side inside the intake surge tank 30.

The intake hole 30a and the intake pipe 33 are provided for each cylinder, and define an intake passage for each cylinder in cooperation with the intake port 22 of each cylinder. The inlet ends of the intake pipes 33 define intake ports of the engine 4. As described below, intake passages extend to the head cover 15 side, such that the length of the intake passages can be secured while the first exhaust passage 62 is formed to be long.

At the inlet ends of the intake pipes 33, a variable intake pipe mechanism 34 is provided. The variable intake pipe mechanism 34 includes an auxiliary intake pipe 35 removably connected to the intake pipes 33, and a pair of servo motors 36 which drives the auxiliary intake pipes 35. The auxiliary intake pipe 35 is provided for each intake pipe 33 of each cylinder. These auxiliary intake pipes 35 are pivotally supported on a support bracket 37 such that they can move between the connecting position shown by the solid line in FIG. 4 and the separated position shown by a phantom line in FIG. 4.

Figure 7:
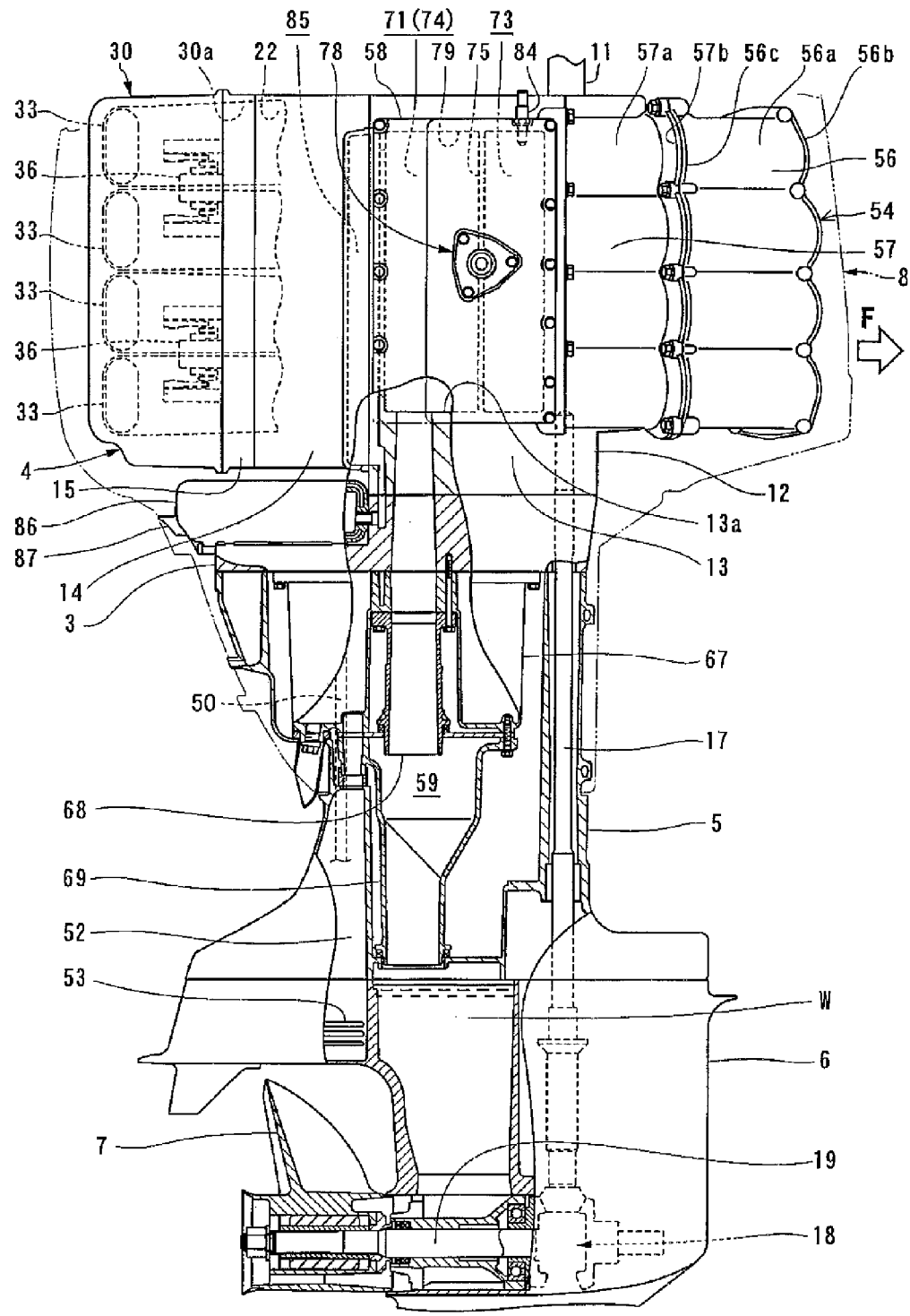
FIG. 7 is a sectional view for explaining a configuration of an exhaust system.

These auxiliary intake pipes 35 are joined to the servo motor 36 via links 38. These auxiliary intake pipes 34 are driven to turn by the servo motors 36 to be arranged to the connecting position or the separated position. By arranging the auxiliary intake pipes 35 at the connecting position, the substantial intake pipe length becomes relatively long. Also, by moving the auxiliary intake pipes 35 to the separated position, the substantial intake pipe length becomes relatively short. As shown in FIG. 7, the servo motors 36 are provided at the upper portion and the lower portion of the head cover 15, respectively. The servo motor 36 positioned on the upper side drives the first cylinder auxiliary intake pipe 35 and the second cylinder auxiliary intake pipe 35, and the servo motor 36 positioned on the lower side drives the third cylinder auxiliary intake pipe 35 and the fourth cylinder auxiliary intake pipe 35.

In addition, as shown in FIG. 3, an intake duct 31 is connected to the upper end of the intake surge tank 30. The intake duct 31 is arranged to lead the air inside the engine cover 8 to the intake ports of the engine 4 (the inlet ends of the intake pipes 33 opening inside the intake surge tank 30). The intake duct 31 preferably has a U-shaped or substantially U-shaped configuration as viewed from the outboard motor right side as shown in the side view of FIG. 5. The intake duct 31 includes a downstream side horizontal portion 41, a downstream side vertical portion 42, an upstream side horizontal portion 43, and an upstream side vertical portion 44.

Figure 5:
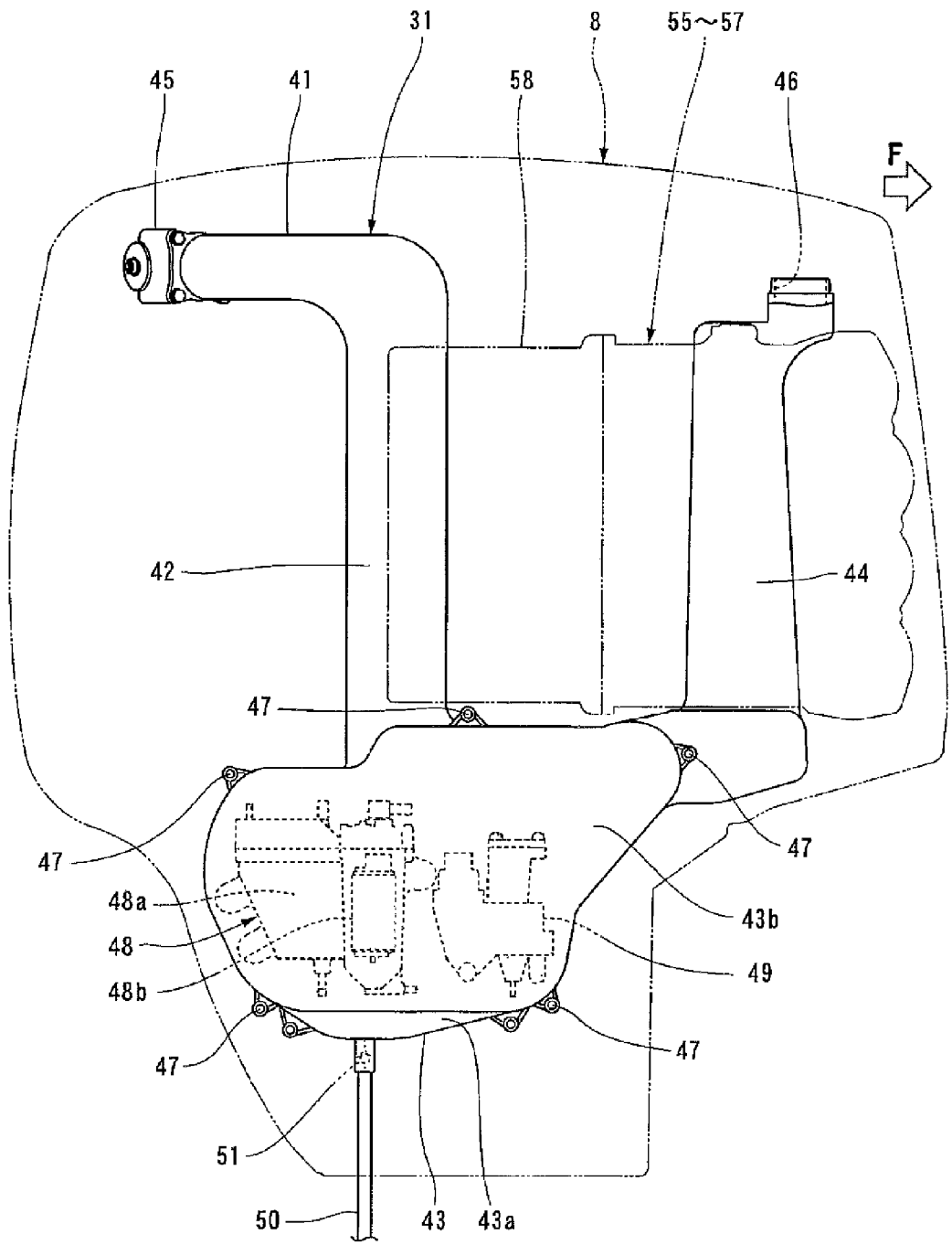
FIG. 5 is a side view of an intake duct.

As shown in FIG. 3, the downstream side horizontal portion 41 extends in the front-rear direction on the upper rear right side of the engine 4, and the downstream side end portion of the downstream side horizontal portion 41 (in FIG. 3, right end portion) is connected to an upper end portion of the intake surge tank 30. In the downstream side horizontal portion 41, a throttle valve 45 is provided. Also, as shown in FIG. 3, the downstream side vertical portion 42 is positioned on the lateral right side of the engine 4. The downstream side vertical portion 42 extends downward to the vicinity of the lower end portion of the engine 4 from the front end portion of the downstream side horizontal portion 41. Also, as shown in FIG. 5, the upstream side horizontal portion 43 extends forward from the lower end portion of the downstream side vertical portion 42. In addition, the upstream side vertical portion 44 extends upward from the front end portion of the upstream side horizontal portion 43 to the height of the vicinity of the upper end portion of the engine 4.

As shown in FIG. 5, at the upper end portion of the upstream side vertical portion 44, an air suction port 46 is provided. The air suction port 46 defines an inlet end of the intake duct 31. The air suction port 46 has a tubular shape extending in the up-down direction. As shown in FIG. 3, an opening shape of the air suction port 46 preferably has an elongated oval shaped that is elongated in the left-right direction of the outboard motor 1. The air suction port 46 is arranged at a forward side upper end portion of the outboard motor 1 inside the engine cover 8 at a central portion in the left-right direction of the outboard motor 1. The air suction port 46 communicates with the engine 4 via the intake duct 31, the intake surge tank 30, and intake pipes 33 of the respective cylinders. In the present preferred embodiment of the present invention, an intake passage is preferably defined by the intake duct 31, the intake surge tank 30, and the intake pipes 33 of the respective cylinders.

As shown in FIG. 5, the intake duct 31 preferably has a U-shaped or substantially U-shaped configuration protruding downward in a side view. Specifically, the intake duct 31 has a pair of upper end portions and a bottom portion provided between these upper end portions. The pair of upper end portions of the intake duct 31 are respectively positioned at an upper portion of the inside of the engine cover 8. The air suction port 46 and the throttle valve 45 are positioned at the pair of upper end portions of the intake duct 31. The bottom portion of the intake duct 31 is positioned at a lower portion of the inside of the engine cover 8. The intake duct 31 extends in the up-down direction from the upper side of the engine 4 to the lower end portion of the engine 4 inside of the engine cover 8. Therefore, the bottom portion of the intake duct 31 is positioned at substantially the same height as the lower end portion of the engine 4.

To the lowest portion of the upstream side horizontal portion 43, a drainage pipe 50 is connected via a check valve 51. The drainage pipe 50 is arranged to drain water which has flowed downwardly to the bottom inside the intake duct 31. The check valve 51 allows drainage of water from the inside of the upstream side horizontal portion 43 to the drainage pipe 50. Also, the check valve 51 blocks entrance of water into the inside of the upstream side horizontal portion 43 from the drainage pipe 50.

As shown in FIG. 7, the drainage pipe 50 is connected to a coolant discharge passage 52 provided inside the upper casing 5. The coolant discharge passage 52 communicates with a suck-out port 53 opened at a front side (upstream side) of the propeller 7. When the marine vessel runs, a negative pressure (lower than the atmospheric pressure) generated on the upstream side of the propeller 7 is applied to the coolant discharge passage 52. In detail, the suck-out port 53 is arranged at a position at which a negative pressure is generated by a water current generated by rotation of the propeller 7. Therefore, when the hull runs, a suctioning force toward the suck-out port 53 is applied to the inside of the coolant discharge passage 52. Therefore, when the hull runs while the check valve 51 is opened, water flowing down to the bottom of the intake duct 31 is discharged to the outside of the outboard motor 1. In the present preferred embodiment of the present invention, a suction passage is preferably defined by the drainage pipe 50 and the coolant discharge passage 52.

Figure 6:
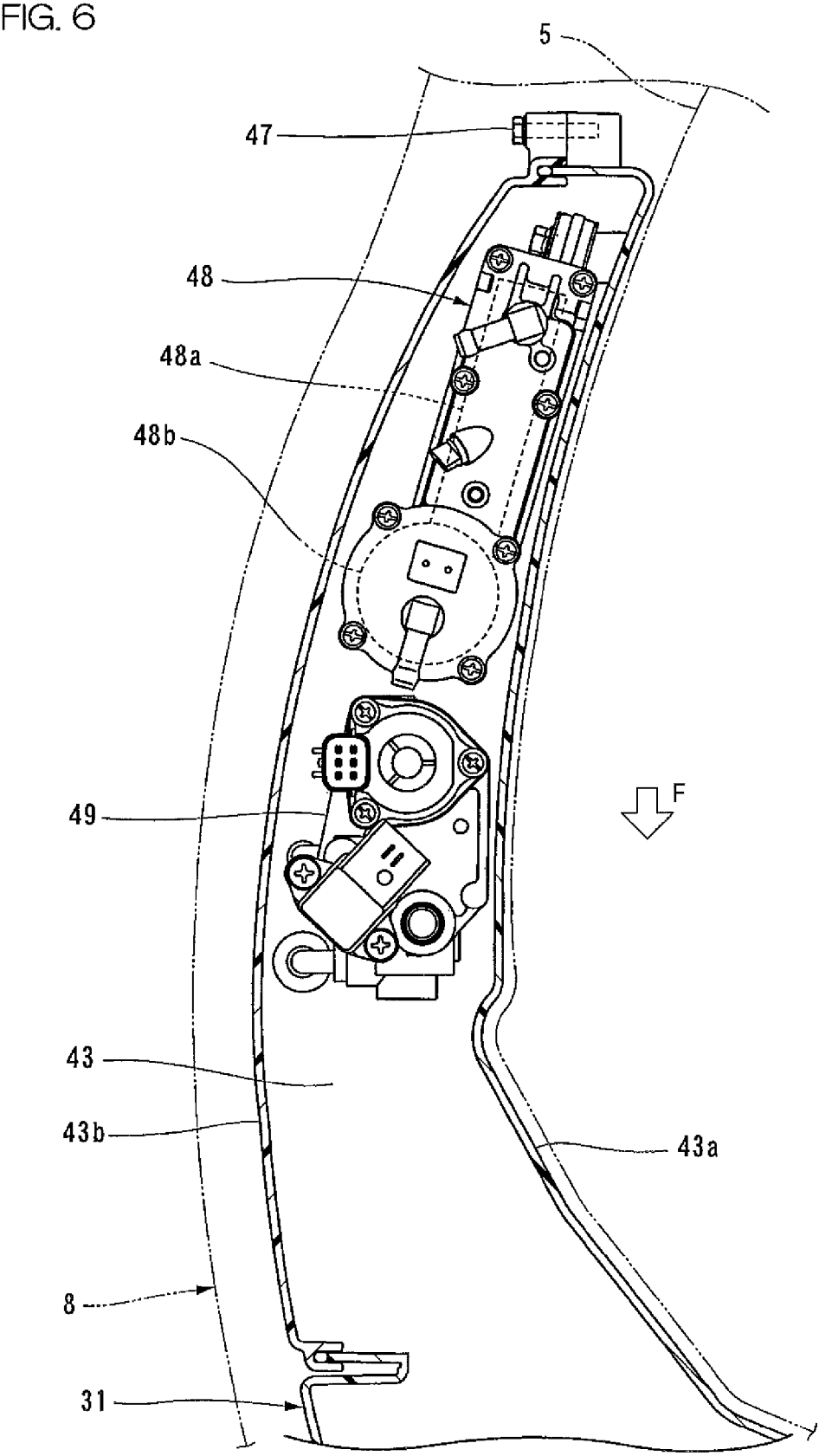
FIG. 6 is an enlarged sectional view of a portion of the intake duct.

FIG. 6 is an enlarged sectional view of a portion of the intake duct 31. The upstream side horizontal portion 43 of the intake duct 31 includes a duct body 43a and a lid body 43b. The duct body 43a opens rightward (leftward in FIG. 6) of the outboard motor, that is, toward the opposite side of the engine 4. The opening portion of the duct body 43a is closed by the lid body 43b. The lid body 43b is removably attached to the duct body 43a by an attaching bolt 47, for example.

Inside the upstream side horizontal portion 43, a vapor separator tank 48 and an idling air regulating valve 49 are arranged. The vapor separator tank 48 is arranged so as to discharge evaporated gas (vapor of fuel) generated inside the vapor separator tank 48 into the upstream side horizontal portion 43 (intake duct 31). Also, the idling air regulating valve 49 is for controlling an air supply amount when the throttle valve 45 (see FIG. 3) is fully closed.

The vapor separator tank 48 and the idling air regulating valve 49 are removably attached to the intake duct 31, respectively. The vapor separator tank 48 and the idling air regulating valve 49 are attached from the outside of the intake duct 31 in a state in which the lid body 43b is removed from the duct body 43a. Also, the vapor separator tank 48 and the idling air regulating valve 49 are removed from the outside of the intake duct 31 in a state in which the lid body 43b is removed from the duct body 43a.

Inside the vapor separator tank 48, a float chamber 48a, a high pressure fuel pump 48b, and a fuel filter (not shown) are provided. The float chamber 48a has a function of storing fuel and a function of separating bubbles. The high pressure fuel pump 48b supplies fuel inside the float chamber 48a to an injector 27 (see FIG. 3).

FIG. 7 is a sectional view for describing a configuration of an exhaust system. The main exhaust passage 59 opens in water at the shaft center of the propeller 7. The main exhaust passage 59 preferably includes a plurality of members. Specifically, the plurality of members of the main exhaust passage 59 include a cylinder body 13, an engine support member 3, an oil pan 67 attached to the lower end of the engine support member 3. Further, the plurality of members of the main exhaust passage 59 include a pipe 68 which is attached to an oil pan 67, a muffler 69 which is attached to the lower end of the oil pan 67 and extends downward, the upper casing 5 which houses the muffler 69, and the lower casing 6.

Figure 8:
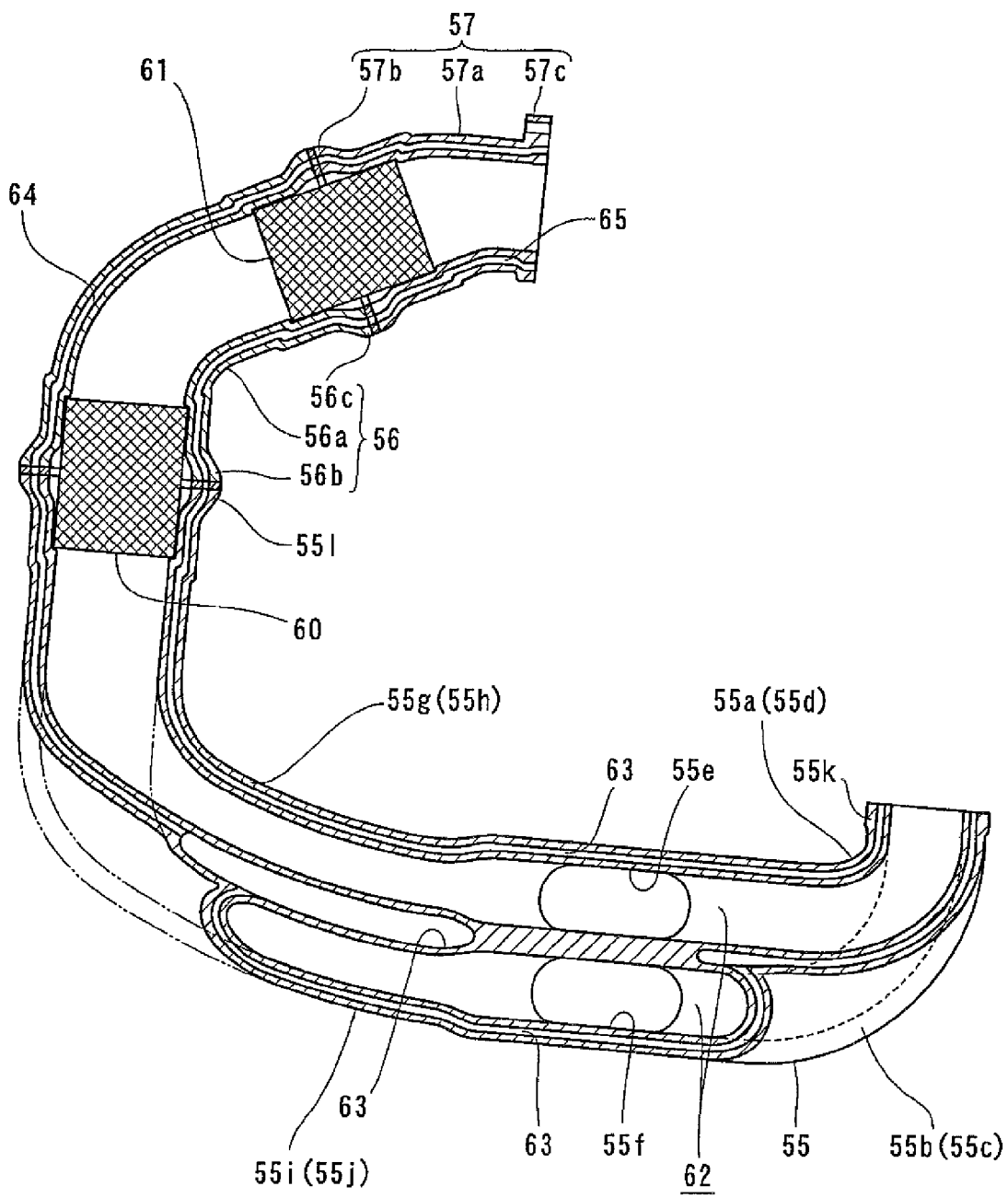
FIG. 8 is a sectional view of an exhaust pipe, along VIII-VIII of FIG. 2.

FIG. 8 is a sectional view of an exhaust pipe along VIII-VIII of FIG. 2. The first to third exhaust pipes 55 to 57 are preferably molded by casting into pipe shapes, respectively, for example. The first exhaust pipe 55 preferably has a double pipe structure such that the first exhaust passage 62 is covered by a coolant passage 63. Also, the second and third exhaust pipes 56 and 57 also preferably have the same double pipe structure as the first exhaust pipe 55, formed in a pipe shape by casting, for example. The coolant passage 63 formed inside the first exhaust pipe 55 communicates with a coolant passage (not shown) of the cylinder head 3. Also, the coolant passage 63 is connected to the coolant passage 66 (see FIG. 9) inside the exhaust chamber 58 via the coolant passages 64 and 65 inside the second exhaust pipe 56 and the third exhaust pipe 57.

Inside the connecting portion between the first exhaust pipe 55 and the second exhaust pipe 56, a first catalyst 60 is provided. In addition, inside the connecting portion between the second exhaust pipe 56 and the third exhaust pipe 57, a second catalyst 61 is provided. The first and second catalysts 60 and 61 preferably are made of a so-called ternary catalyst. The ternary catalyst can detoxify hydrocarbon, nitrogen oxide, and carbon monoxide at the time of combustion near a theoretical air-fuel ratio at the same time. As shown in FIG. 3, the first catalyst 60 is arranged on the opposite side of the crank case 12 across the air suction port 46 of the intake duct 31. In other words, the first catalyst 60 is arranged on the further front of the outboard motor 1 than the air suction port 46 in a plan view.

In addition, as shown in FIG. 2, the first exhaust pipe 55 collects exhaust gases exhausted from the four exhaust gas outlets 29 of the cylinder head 14 at two points, and further distributes the exhaust gases to four points (four second exhaust pipes 56). In detail, the first exhaust pipe 55 preferably includes four upstream portions 55a to 55d, two collecting portions (first and second collecting portions 55e and 55f), and four downstream portions (first to fourth downstream portions 55g to 55j), for example.

Inlet ends of the four upstream portions 55a to 55d are respectively connected to the exhaust gas outlets 29 of the four cylinders. An outlet end of the first cylinder upstream portion 55a and an outlet end of the fourth cylinder upstream portion 55d are connected to the first collecting portion 55e. Also, an outlet end of the second cylinder upstream portion 55b and an outlet end of the third cylinder upstream portion 55c are connected to the second collecting portion 55f. In other words, the first and fourth cylinder upstream portions 55a and 55d which are respectively connected to the first cylinder #1 and the fourth cylinder #4 to be ignited in ignition periods 360 degrees different from each other are connected to the first collecting portion 55e. In addition, the second and third cylinder upstream portions 55b and 55c respectively connected to the second cylinder #2 and the third cylinder #3 to be ignited in ignition periods 360 degrees different from each other are connected to the second collecting portion 55f. The first and second downstream portions 55g and 55h are connected to the first collecting portion 55e so as to branch from the first collecting portion 55e. Also, the third and fourth downstream portions 55i and 55j are connected to the second collecting portion 55f so as to branch from the second collecting portion 55f.

As shown in FIG. 3, the first and fourth cylinder upstream portions 55a and 55d are arranged closer to the engine 4 in the left-right direction of the outboard motor 1 than the second and third cylinder upstream portions 55b and 55c. Therefore, the first collecting portion 55e is provided at a position closer to the engine 4 than the second collecting portion 55f. As shown in FIG. 2, the first collecting portion 55e and the second collecting portion 55f are arranged at substantially the same height as that of the central portion in the up-down direction of the cylinder body 13. Accordingly, the pipe length of the first cylinder upstream portion 55a and the pipe length of the fourth cylinder upstream portion 55d can be made equal to each other. Also, the pipe length of the second cylinder upstream portion 55b and the pipe length of the third cylinder upstream portion 55c can be made equal to each other.

The first and fourth cylinder upstream portions 55a and 55d are preferably longer than the second and third cylinder upstream portions 55b and 55c in a side view shown in FIG. 2. On the other hand, the second and third cylinder upstream portions 55b and 55c are preferably constructed such that the radius of curvature of the bent portions for connection to the cylinder head 14 become higher than the radius of curvature of the first and fourth cylinder upstream portions 55a and 55d as shown in FIG. 3. With this configuration, pipe lengths of the four upstream portions 55a to 55d are matched with each other.

As shown in FIG. 8, at the inlet ends of the first to fourth cylinder upstream portions 55a to 55d, an upstream side attaching flange 55k arranged to attach the first exhaust pipe 55 to the cylinder head 14 is integrally provided. The inlet ends of the first to fourth cylinder upstream portions 55a to 55d are connected to each other by the upstream side attaching flange 55k.

On the other hand, the first and second downstream portions 55g and 55h extend upward and downward as they go to the downstream side (forward of the outboard motor 1, and toward the crank case 12 side in a side view shown in FIG. 2) from the first collecting portion 55e as shown in FIG. 2. These first and second downstream portions 55g and 55h are bent forward of the outboard motor 1 such that their inclination angles with respect to the horizontal become smaller at positions corresponding to a connection portion between the crank case 12 and the cylinder body 13 as viewed from the lateral. A tip portion from the bent portion of the first downstream portion 55g which is the upper one of the first and second downstream portions 55g and 55h inclines forward and downward, and extends straight in a side view. A tip portion from the bent portion of the second downstream portion 55h positioned on the lower side inclines forward and upward, and extends straight in a side view.

In addition, the third and fourth downstream portions 55i and 55j connected to the second collecting portion 55f extend upward and downward, respectively, as they extend to the downstream side (forward) from the second collecting portion 55f as shown in FIG. 2. These third and fourth downstream portions 55i and 55j are bent such that their inclination angles with respect to the horizontal become smaller than those of the upstream sides at positions corresponding to the connection portion between the crank case 12 and the cylinder body 13 as viewed from the lateral. The inclination angles with respect to the horizontal of tip portions from the bent portions of the third and fourth downstream portions are larger than the inclination angles with respect to the horizontal of the first and second downstream portions 55g and 55h. A tip portion from the bent portion of the third downstream portion 55i which is the upper one of the third and fourth downstream portions 55i and 55j inclines forward and upward, and extends straight in a side view. A tip portion from the bent portion of the fourth downstream portion 55j positioned on the lower side is inclined forward and downward, and extends straight in a side view.

An outlet end portion of the third downstream portion 55i is positioned above an outlet end portion of the first downstream portion 55g. Also, an outlet end portion of the fourth downstream portion 55j is positioned below an outlet end portion of the second downstream portion 55h. As shown in FIG. 3, the outlet end portions of the first to fourth downstream portions 55g to 55j are bent toward the center in the left-right direction of the outboard motor 1.

The second exhaust pipe 56 is connected to the first exhaust pipe 55 ahead of the crank case 12, that is, on the opposite side of the cylinder head 3 with respect to the crank case 12 as shown in FIG. 3. The second exhaust pipe 56 is arranged so as to extend to the diagonally right front of the engine 4. The second exhaust pipe 56 is preferably formed by integrally molding by casting, for example, the four tubular portions 56a and two flanges 56b and 56c respectively positioned on the upstream side ends and the downstream side ends of these tubular portions 56a as shown in FIG. 7 and FIG. 8.

The third exhaust pipe 57 is arranged on the lateral right side of the engine 4, that is, at a position adjacent aside the crank case 12 as shown in FIG. 3. The third exhaust pipe 57 extends in the front-rear direction of the outboard motor 1, that is, a direction in which the crank case 12 and the cylinder body 13 are lined up. Then, the third exhaust pipe 57 connects the second exhaust pipe 56 to the exhaust chamber 58. The exhaust chamber 58 is positioned on the lateral right side of the cylinder body 13, that is, on the opposite side of the first exhaust pipe 55 in the left-right direction of the outboard motor 1. The third exhaust pipe 57 is preferably formed by integrally molding by casting, for example, the four tubular portions 57a and two flanges 57b and 57c respectively positioned on the upstream side ends and the downstream side ends of these tubular portions 57a as shown in FIG. 7 and FIG. 8.

As shown in FIG. 3, these first to third exhaust pipes 55 to 57 extend from the exhaust gas outlets 29 in a plan view. Further, the first to third exhaust pipes 55 to 57 form a bypass exhaust pipe which extends along the crank case 12 in the vicinity of the outside (vicinity of the front) of the crank case 12, and bypasses the engine 4 and extends to the opposite side in the left-right direction of the outboard motor 1 (right side of the outboard motor 1). Preferably, the length of the first to third exhaust pipes 55 to 57 (the bypass exhaust pipe) is designed so as to surround the crankshaft 11 at angles not less than 90 degrees in the rotation direction of the crankshaft 11.

As shown in FIG. 3, the upstream portion of the first exhaust passage 62 defined inside the first to third exhaust pipes 55 to 57 and the intake passage on the downstream side of the intake surge tank 30 (intake passage defined inside the intake pipe 33, inside the intake hole 30a, and inside the intake port 22) have a substantially S shape in a plan view. The intake passage on the downstream side of the intake surge tank 30 preferably is an intake passage formed inside the intake pipe 33, the intake hole 30a, and the intake port 22. Of course, the first to third exhaust pipes 55 to 57 and the intake passage may be formed into a mirror-reversed S shape in a plan view (that is, an S shape in a bottom view). This mirror-reversed S shape is also included in one mode of "S shape." In other words, the first to third exhaust pipes 55 to 57 and the intake passage extend opposite to each other in the left-right direction of the outboard motor from the cylinder head 14. Then, the intake passage curves so as to bypass the cylinder head 14 at the rear portion of the outboard motor 1. On the other hand, the bypass exhaust pipe defined by the first to third exhaust pipes 55 to 57 curves so as to bypass the engine 4 to the front of the crank case 12 at the front portion of the outboard motor 1.

Figure 9:
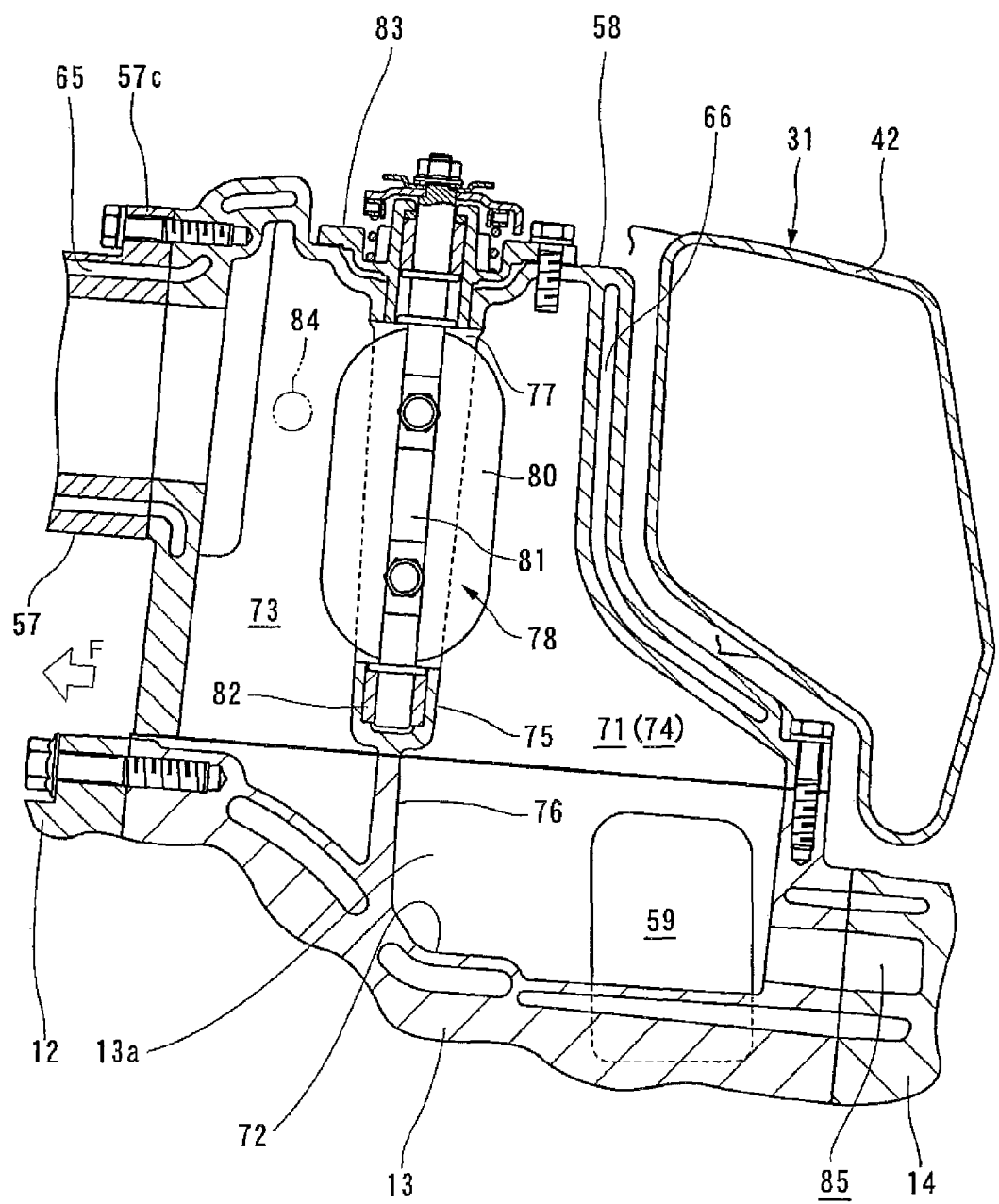
FIG. 9 is a sectional view of an exhaust chamber.

FIG. 9 is a sectional view of the exhaust chamber 58. The exhaust chamber 58 preferably has a box shape which opens to the cylinder body 13. The exhaust chamber 58 is attached to the side portion on the outboard motor right side of the cylinder body 13 such that the opening portion of the exhaust chamber is closed by the cylinder body 13. On the side portion of the cylinder body 13, a recess portion 72 which opens to the exhaust chamber 58 (to the right side of the outboard motor 1) is provided. The recess portion 72 partitions an expansion chamber 71 in conjunction with the exhaust chamber 58. Accordingly, the expansion chamber 71 has a capacity larger than the inner space of the exhaust chamber 58. On the lower wall 13a of the cylinder body 13 which forms the side wall on the lower side of the recess portion 72, as shown in FIG. 7 and FIG. 9, the main exhaust passage 59 opens.

As shown in FIG. 5, near the lower side of the exhaust chamber 58, the upstream side horizontal portion 43 of the intake duct 31 is positioned. Also, as shown in FIG. 9, on the opposite side (near the rear side) of the third exhaust pipe 57 of the exhaust chamber 58, the downstream side vertical portion 42 of the intake duct 31 is positioned. As shown in FIG. 7, the exhaust chamber 58 preferably has a height in the up-down direction longer than the width in the front-rear direction of the outboard motor 1 to allow the third exhaust pipes 57 to be connected thereto.

In addition, as shown in FIG. 9, inside the outer wall of the exhaust chamber 58, a coolant passage 66 is provided. The coolant passage 66 is arranged such that a coolant is supplied from the coolant passage 65 of the third exhaust pipe 57. Also, the coolant passage 66 is arranged so as to discharge a coolant supplied from the coolant passage 65 of the third exhaust pipe 57 to a coolant discharge passage (not shown) of the cylinder body 13.

In addition, inside the exhaust chamber 58, a partition 75 arranged to partition the expansion chamber 71 into an upstream exhaust gas chamber 73 and a downstream exhaust gas chamber 74 is provided. The partition 75 partitions the expansion chamber 71 into the two chambers 73 and 74 in cooperation with a longitudinal wall 76 disposed on the cylinder body 13.

In the partition 75, a communicating hole 77 which allows for communication between both gas chambers 73 and 74 is provided. Further, the partition 75 is provided with an on-off valve 78 which opens and closes the communicating hole 77. The communication hole 77 is positioned at the central portion in the up-down direction of the division wall 75, that is, at a position spaced downward from the upper wall 79 (see FIG. 7) inside the exhaust chamber 58 in the first exhaust passage 62. Further, the communication hole 77 is positioned at a central portion of the division wall 75 in the left-right direction of the outboard motor 1. The opening shape of the communicating hole 77 preferably is an ellipse shape that allows the valve body 80 of the on-off valve 78 to be inserted therein.

The on-off valve 78 is a butterfly valve having a disk-shaped valve body 80 inserted inside the communicating hole 77. The valve body 80 preferably includes an elongated oval plate that is elongated in the left-right direction of the partition 75. The valve body 80 is attached to a valve shaft 81 extending along the partition 75. The valve shaft 81 is pivotally supported by a bearing 82 and a cover 83 fixed to the partition 75. In addition, the valve shaft 81 is connected to a drive device not shown via a wire. The valve body 80 and the valve shaft 81 rotate according to driving of the drive device.

The on-off valve 78 is driven by the drive device so as to close when the crankshaft 11 rotates in reverse or the pressure inside the first exhaust passage 62 excessively lowers and a high negative pressure is generated inside the exhaust chamber 58, and to open at other times. A sensor (not shown) for detecting the rotating speed of the crankshaft 11 detects whether the crankshaft 11 has rotated in reverse. Also, the pressure inside the exhaust chamber 58 is detected by a pressure sensor not shown.

As shown in FIG. 7, at the upper end of the exhaust chamber 58, an oxygen sensor 84 is provided to detect the amount of oxygen in the exhaust gas. The oxygen sensor 84 is positioned at an upper end portion of the upstream exhaust gas chamber 73. The oxygen sensor 84 detects an amount of oxygen in the exhaust gas flowing inside the upstream exhaust gas chamber 73. The oxygen sensor 84 sends the detected amount of oxygen as detection data to an ECU (Electronic Control Unit, not shown) of the engine 4. The ECU controls the fuel injection amount of the injector 27 and the ignition timing of the ignition plug (not shown), etc., based on the speed of the engine 4, the opening degree of the throttle valve 45, and the amount of oxygen in the exhaust gas detected by the oxygen sensor 84, etc.

Next, a second exhaust passage 85 will be described. As shown in FIG. 7, the exhaust device 54 further includes a second exhaust passage 85 which exhausts exhaust gas inside the first exhaust passage 62 into the atmosphere. The second exhaust passage 85 is a passage arranged to expel exhaust gas to the outside of the outboard motor 1 when the speed of the engine 4 is low as in the case during idling. In other words, during idling of the engine 4, the pressure of exhaust gas to be exhausted from the engine 4 is relatively low. Therefore, when idling the engine 4, water (indicated by a reference symbol W in FIG. 7) which has entered the inside of the first exhaust passage 62 from an outlet of the first exhaust passage 62 (outlet of the main exhaust passage 59) cannot be discharged by the pressure of the exhaust gas. Therefore, in this case, the exhaust gas is exhausted exclusively through the second exhaust passage 85.

The second exhaust passage 85 extends along the up-down direction. The second exhaust passage 85 is arranged inside the engine 4 and inside the engine support member 3. The second exhaust passage 85 connects the sound absorbing chamber 86 and the exhaust chamber 58. The second exhaust passage 85 is connected to an end portion on the outboard motor front side of the sound absorbing chamber 86. The sound absorbing chamber 86 is attached onto the engine support member 3.

Figure 10:
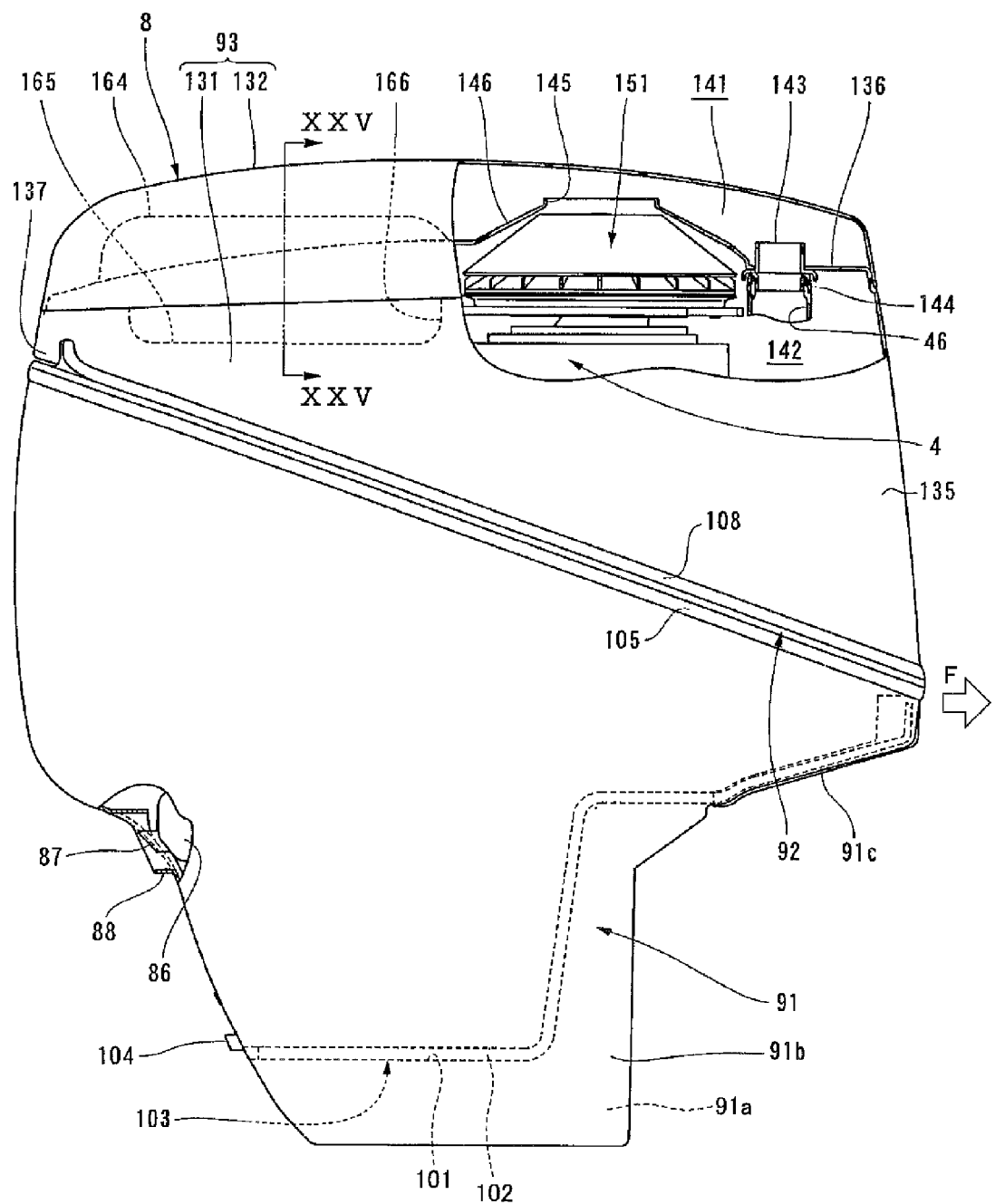
FIG. 10 is a side view of an engine cover, drawn in a state in which a portion of a top cover is cut-away.

At a front end portion of the sound absorbing chamber 86, an exhaust gas inlet is provided. Also, at a rear end portion of the sound absorbing chamber 86, an exhaust pipe 87 corresponding to an exhaust gas outlet is provided. Exhaust gas which has flowed into the sound absorbing chamber 86 from the front end portion of the sound absorbing chamber 86 is discharged from the exhaust pipe 87 arranged at the rear end portion of the sound absorbing chamber 86. As shown in FIG. 10, the exhaust pipe 87 is inserted into a cooling air main discharge port 88 provided at the rear end portion of the engine cover 8. The cooling air main discharge port 88 communicates with the inside and the outside of the engine cover 8. Between the cooling air main discharge port 88 and the exhaust pipe 87, a space is provided so as to allow cooling air described later to be discharged.

Figure 11:
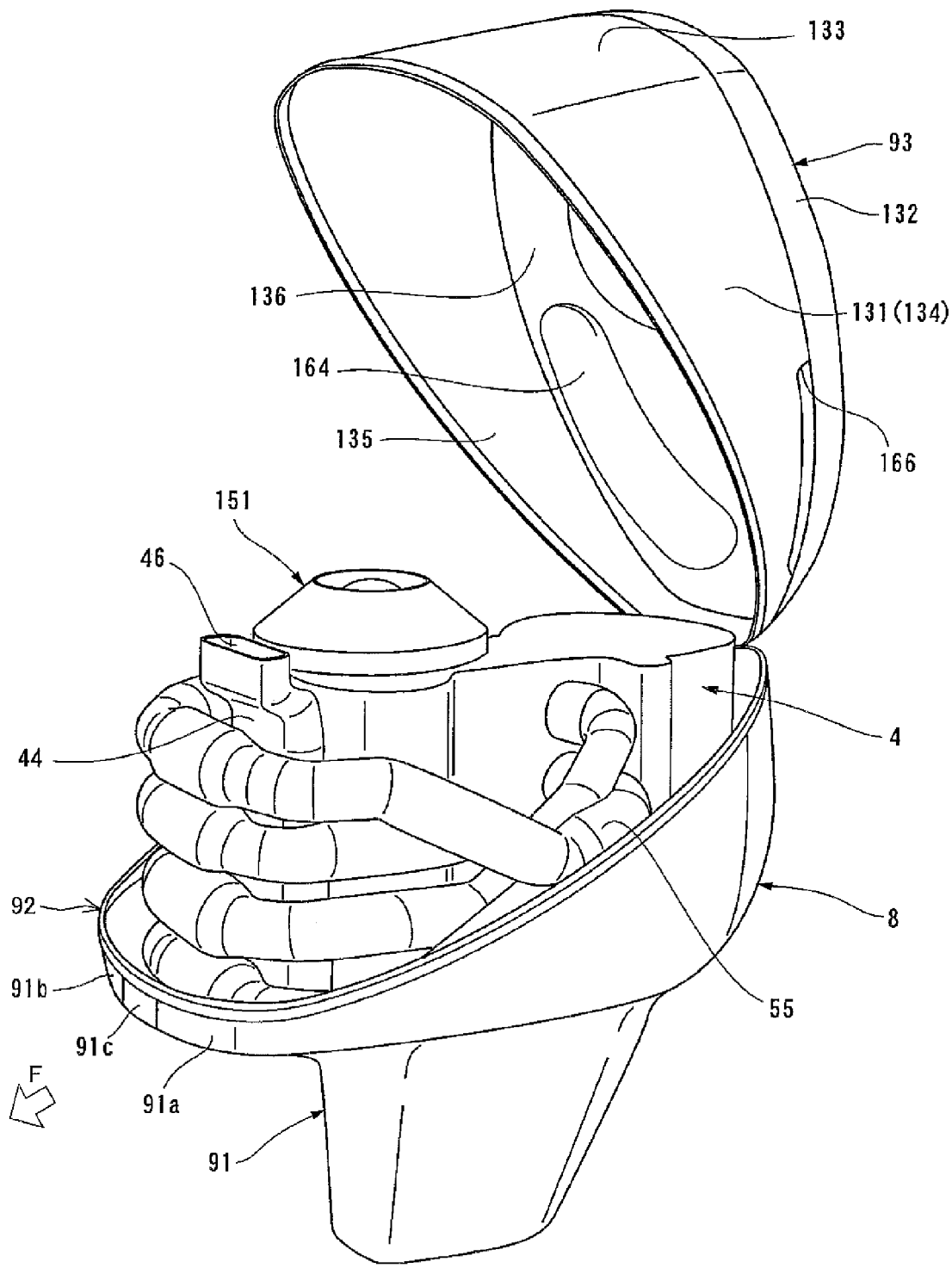
FIG. 11 is a perspective view of a configuration of an outboard motor upper portion in a state in which the top cover is opened.

FIG. 10 is a side view of the engine cover 8, drawn in a state in which a portion of the top cover 93 is cut-away. Also, FIG. 11 is a perspective view of a configuration of an outboard motor upper portion in a state in which the top cover 93 is opened. The engine cover 8 includes a bottom cover 91, a reinforcing frame 92, and a top cover 93. The top cover 93 is attached to the upper end portion of the bottom cover 91 via the reinforcing frame 92 so as to open and close.

The bottom cover 91 includes a left side cover body 91a and a right side cover body 91b, and a frame supporting bracket 91c sandwiched between the front end portions of the cover bodies 91a and 91b. The left and right cover bodies 91a and 91b and the frame supporting bracket 91c may be made of an aluminum alloy, for example. The left and right cover bodies 91a and 91b and the frame supporting bracket 91c are respectively molded by, for example, casting so as to have predetermined shapes.

As shown in FIG. 1, the bottom cover 91 extends upward from the upper casing 5. The left and right cover bodies 91a and 91b cover a portion of the upper casing 5 and a portion of the engine 4 from the lateral of the outboard motor 1. The left and right cover bodies 91a and 92b are attached to the upper casing 5 by bolts (not shown), for example. The left and right cover bodies 91a and 92b are supported by the upper casing 5.

As shown in FIG. 10, at the rear end portion of the bottom cover 91, a cooling air auxiliary discharge port 104 is provided. The cooling air auxiliary discharge port 104 causes the inside to communicate with the outside of the bottom cover 91. In the present preferred embodiment of the present invention, an air outlet is defined by the cooling air auxiliary discharge port 104 and the cooling air main discharge port 88.

Figure 14:
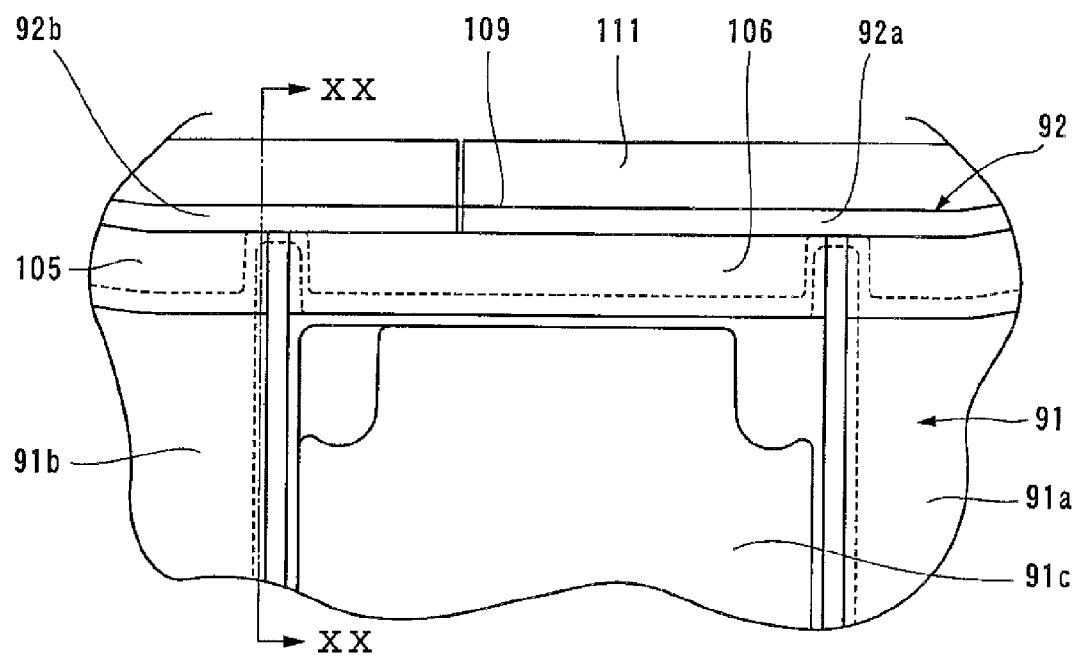
FIG. 14 is an enlarged front view of a portion of a front end portion of the bottom cover.

In addition, as shown in FIG. 10, upper end edges of the left and right cover bodies 91a and 91b respectively slope rearward and upward as viewed from the lateral of the outboard motor 1. A sealing member 105 is attached to the upper end edges of the left and right cover bodies 91a and 91b. The portion between the left and right cover bodies 91a and 91b and the reinforcing frame 92 is sealed by the sealing member 105. Also, as shown in FIG. 14, a sealing member 106 is attached to the reinforcing frame 92. The portion between the upper end portion of the frame support bracket 91c and the reinforcing frame 92 is sealed by the sealing member 106. Accordingly, entrance of water to the inside of the engine cover 8 is prevented.

Also, as shown in FIG. 10, on the outboard motor 1, a sealing portion 103 is provided. The sealing portion 103 seals the portions between the front end portions of the cover main bodies 91a and 91b and the frame supporting bracket 91c. The sealing portion 103 further seals the portions between the cover bodies 91a and 91b and members positioned inside the cover bodies. Members positioned inside the cover bodies 91a and 91b include the upper casing 5, the engine support member 3, and the crank case 12. The sealing portion 103 seals the portions between the cover bodies 91a and 91b and the members positioned inside the cover bodies, and partitions the space between these vertically. Also, the cooling air auxiliary discharge port 104 is arranged near the upper side of the sealing portion 103 at the rear end portion of the bottom cover 91.

Figure 12:
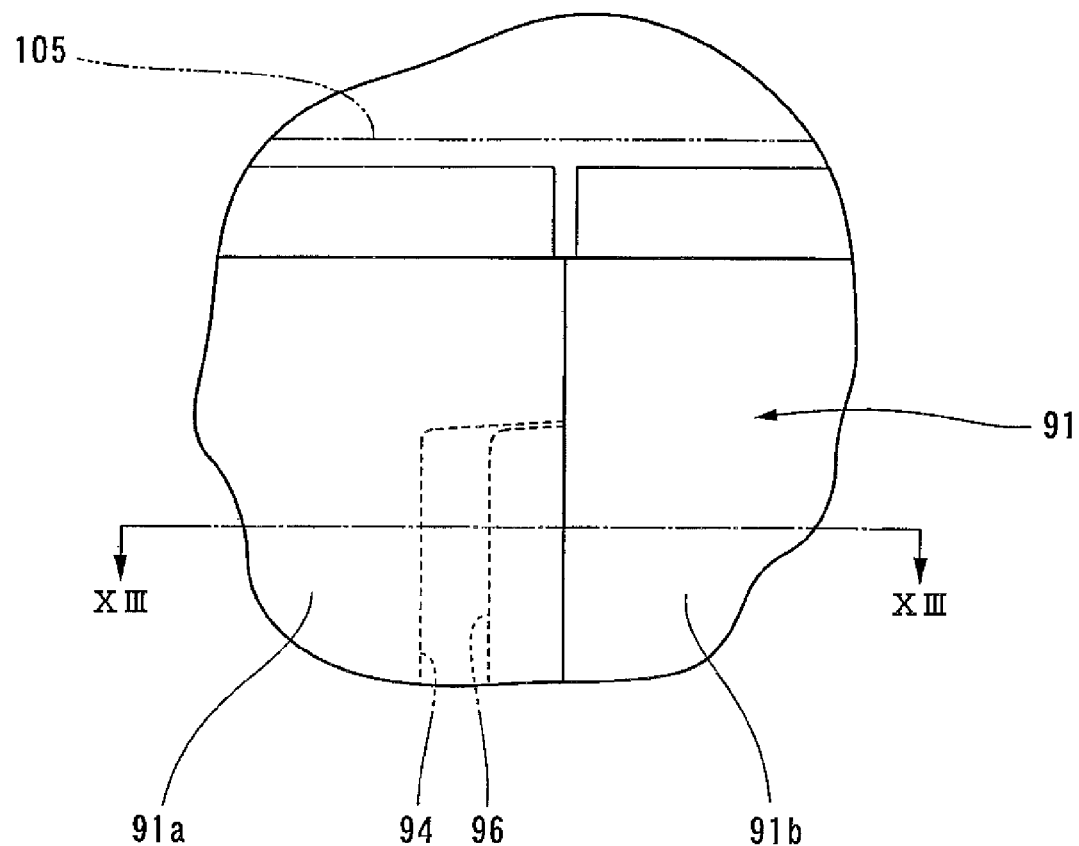
FIG. 12 is an enlarged back view of a portion of a rear end portion of a bottom cover.
Figure 13:
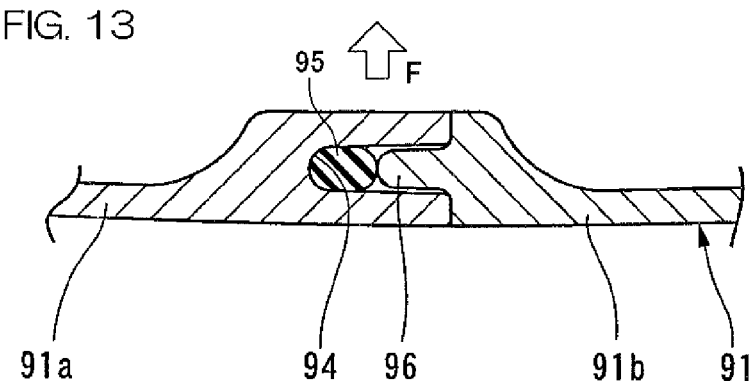
FIG. 13 is a sectional view along XIII-XIII of FIG. 12.

FIG. 12 is an enlarged back view of a portion of the rear end portion of the bottom cover 91. Also, FIG. 13 is a sectional view along XIII-XIII of FIG. 12. The rear end portions of the left and right cover bodies 91a and 91b are joined while being fitted to each other in substantially the entire region from the lower end portions to the upper end portions. In detail, on one of the rear end portions of the left and right cover bodies 91a and 91b, a groove 94 is provided, and a ridge 96 corresponding to the groove 94 is provided on the other rear end portion. In the present preferred embodiment of the present invention, the groove 94 is provided on the rear end portion of the left cover body 91a, and the ridge 96 is provided on the rear end portion of the right cover body 91b. As shown in FIG. 13, the ridge 96 is fitted into the groove 94 in a state in which a sealing material 95 is filled in the groove. Accordingly, the rear end portions of the left and right cover bodies 91a and 91b are joined by being fitted to each other in substantially the entire region from the lower end portions to the upper end portions.

FIG. 14 is an enlarged front view of a portion of the front end portion of the bottom cover 91. The frame supporting bracket 91c is sandwiched by the front end portions of the left and right cover bodies 91a and 91b. Upper portions of the front end portions of the left and right cover bodies 91a and 91b are respectively joined to the frame supporting brackets 91c. Also, the portions lower than the frame supporting bracket 91c of the front end portions of the left and right cover bodies 91a and 91b are joined to each other in a state in which a portion between these is sealed.

Figure 15:
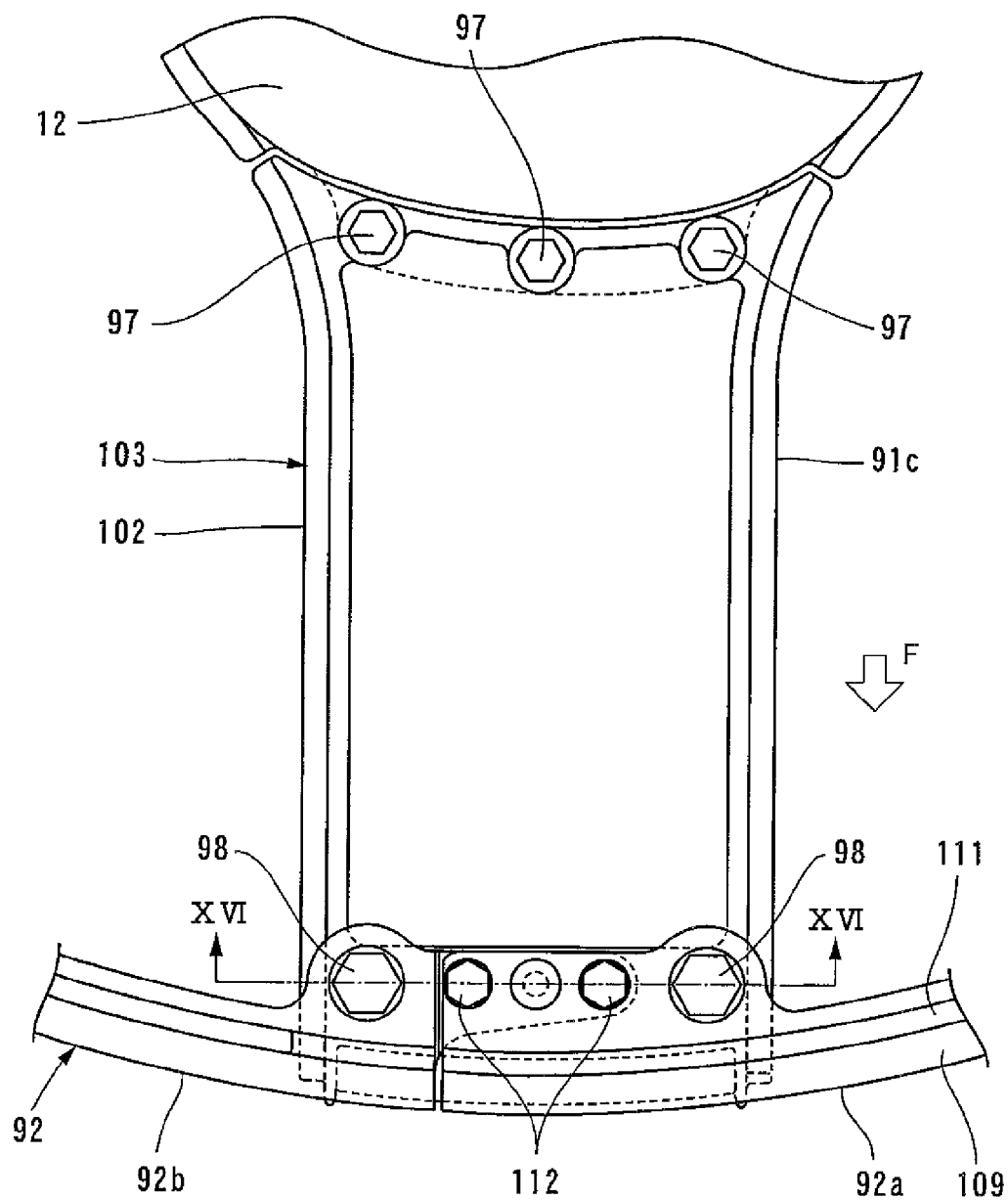
FIG. 15 is an enlarged plan view of a front end portion of a reinforcing frame and a frame supporting bracket.
Figure 16:
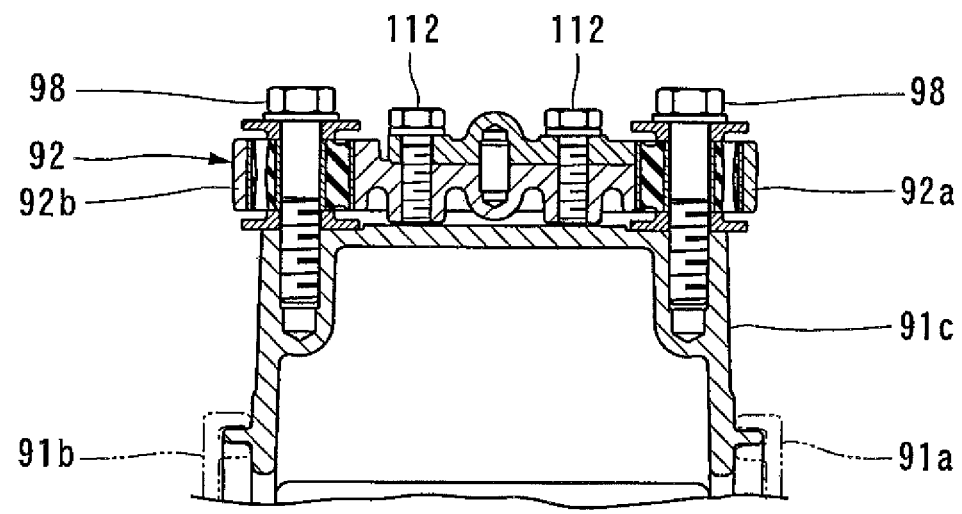
FIG. 16 is a sectional view along XVI-XVI of FIG. 15.

FIG. 15 is an enlarged plan view of the front end portion of the reinforcing frame 92 and the frame supporting bracket 91c. Also, FIG. 16 is a sectional view along XVI-XVI of FIG. 15. The frame supporting bracket 91c is a plate-shaped member having a rectangular shape that is elongated in the front-rear direction of the outboard motor 1 in a plan view. The frame supporting bracket 91c is attached to the front end portion of the crank case 12 by attaching bolts 97, for example. Also, to the front end portion of the frame supporting bracket 91c, the reinforcing frame 92 is attached by two attaching bolts 98, for example, so as to be overlapped from above. As shown in FIG. 10, the frame supporting bracket 91c has a shape similar to the shape of the bottom cover 91 as viewed from the lateral.

Figure 17:
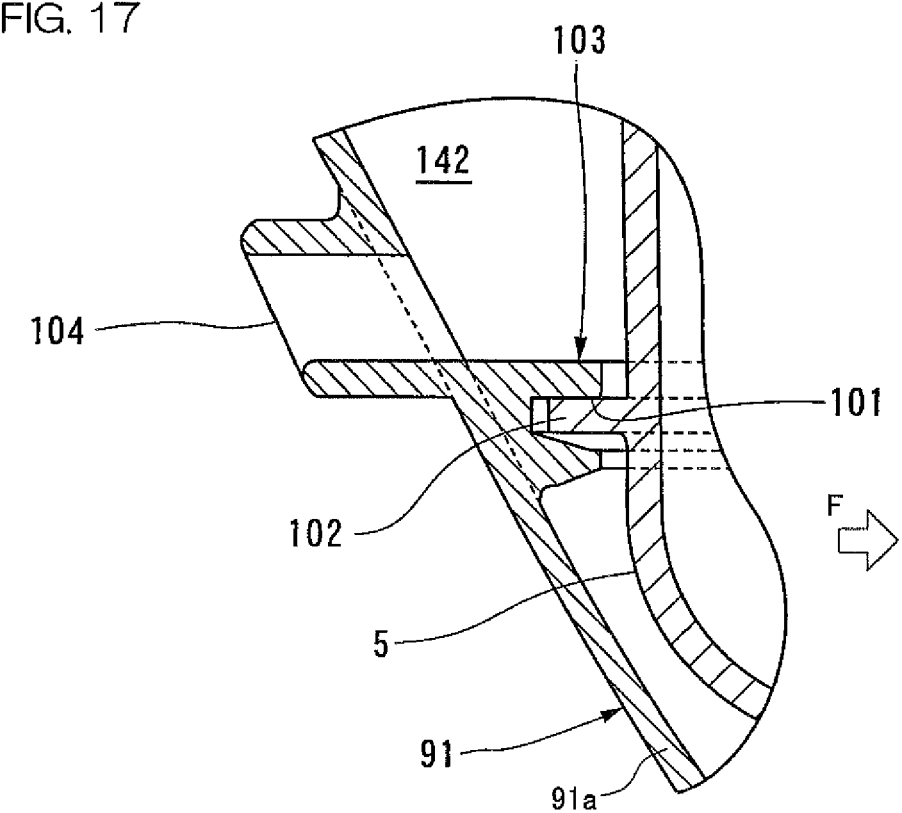
FIG. 17 is a sectional view of a sealing portion.
Figure 20:
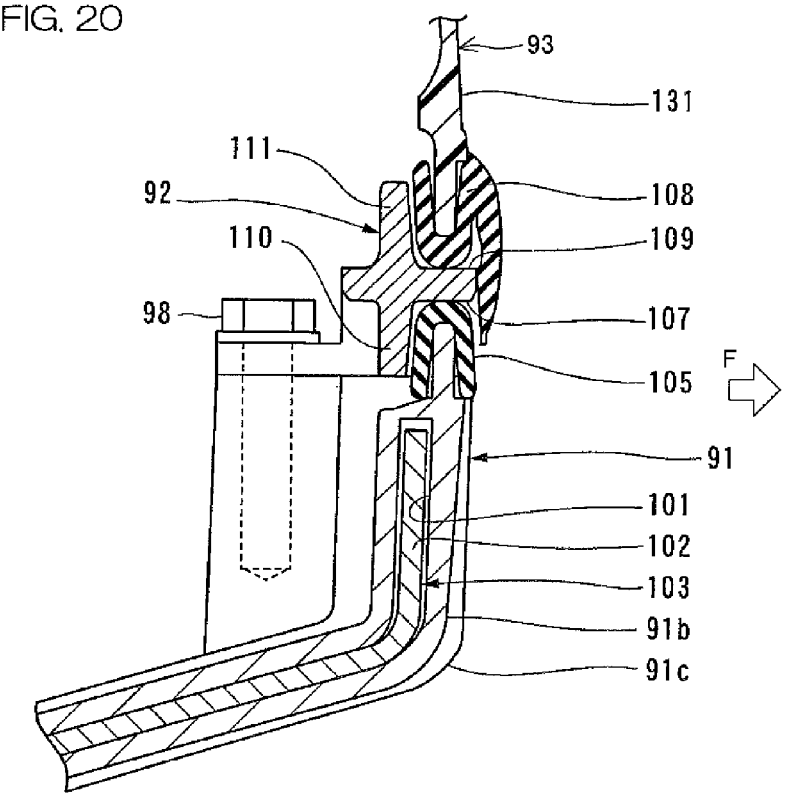
FIG. 20 is a sectional view of the front end portions of the bottom cover and the reinforcing frame, along XX-XX of FIG. 14.

FIG. 17 is a sectional view of the sealing portion 103. The sealing portion 103 includes a groove 101 and a ridge 102 which fits in the groove 101. In the present preferred embodiment of the present invention, the groove 101 is provided along the inner wall surfaces of the cover bodies 91a and 91b. Also, the ridge 102 is provided on the upper casing 5. Further, as shown in FIG. 20, the ridge 102 is provided on the frame supporting bracket 91c. The ridge 102 is also provided on the engine support member 3 and the crank case 12 although this is not shown.

As shown in FIG. 10, the grooves 101 extend in the front-rear direction of the outboard motor 1 from the front end portions to the rear end portions of the cover bodies 91a and 91b while bending in the up-down direction. Also, the grooves 101 extend in the left-right direction of the outboard motor 1 at the rear end portions of the cover bodies 91a and 91b. The two grooves 101 respectively provided on the left and right cover bodies 91a and 91b are continued to each other at the rear end portions of the cover bodies 91a and 91b. In addition, the ridge 102 is provided on members positioned on the inner sides of the frame supporting bracket 91c and the cover bodies 91a and 91b so as to continue seamlessly.

Figure 18:
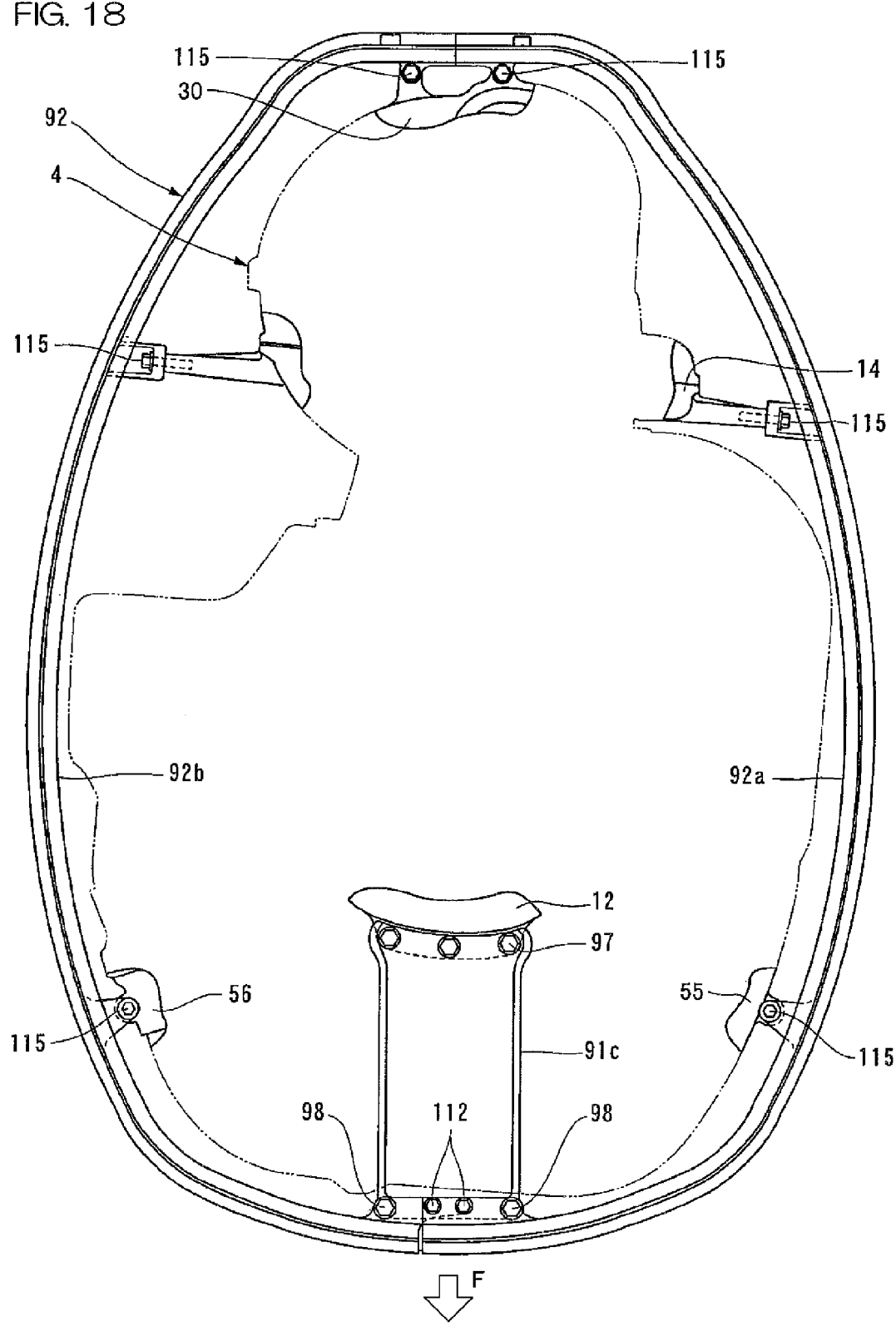
FIG. 18 is a plan view of the reinforcing frame.
Figure 19:
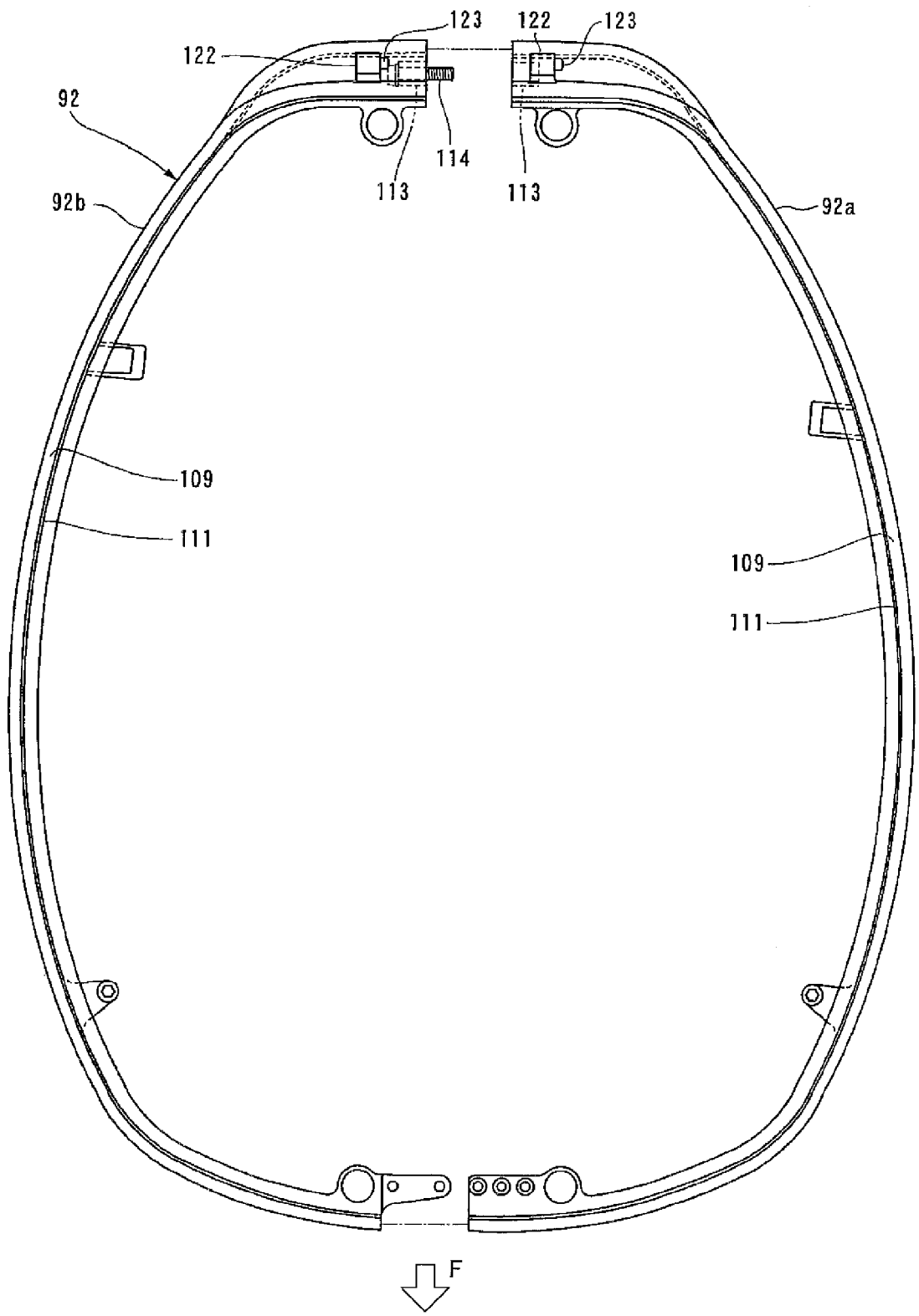
FIG. 19 is a plan view of the reinforcing frame, drawn in a state in which left and right frame bodies are spaced from each other in the left-right direction of the outboard motor.

FIG. 18 is a plan view of the reinforcing frame 92. In addition, FIG. 19 is a plan view of the reinforcing frame 92, drawn in a state in which left and right frame bodies 92a and 92b are spaced from each other in the left-right direction of the outboard motor 1. The reinforcing frame 92 includes the left frame body 92a positioned on the outboard motor left side and the right frame body 92b positioned on the outboard motor right side. The left and right frame bodies 92a and 92b are respectively made of a metal material such as an aluminum alloy. The left and right frame bodies 92a and 92b are respectively molded by casting so as to have predetermined shapes.

The reinforcing frame 92 has a ring shape similar to the external form of the bottom cover 91 in a plan view. Also, the left and right frame bodies 92a and 92b have bow shapes protruding sideward of the outboard motor 1. The front end portions of the left and right frame bodies 92a and 92b are fastened to each other by bolts 112, for example, while being overlapped vertically. Also, the rear end portions of the left and right frame bodies 92a and 92b are fastened to each other by a bolt 114 (see FIG. 19), for example. The bolt 114 fastens two joint blocks 113 (see FIG. 22B) projecting downward from the left and right frame bodies 92a and 92b, respectively. By coupling the front end portions of the left and right frame bodies 92a and 92b to each other and coupling the rear end portions to each other, a reinforcing frame 92 having a ring shape in a plan view is provided.

As shown in FIG. 18, the reinforcing frame 92 is attached to a plurality of members inside the engine cover 8 by a plurality of attaching bolts 98 and 115, for example. The plurality of members to which the reinforcing frame 92 is attached include the intake surge tank 30, the cylinder head 14, the first exhaust pipe 55, the second exhaust pipe 56, and the frame supporting bracket 91c. The reinforcing frame 92 is supported at the front and rear end portions of the outboard motor 1, two points on the outboard motor left side, and two points on the outboard motor right side by being attached to these members. As shown in FIG. 10, the reinforcing frame 92 is attached to the plurality of members while taking a posture sloping rearward and upward in a side view.

In addition, for the reinforcing frame 92, rigidity which can support the weight of the upper portion of the outboard motor 1 is secured. Also, the reinforcing frame 92 is at the outermost position in the left-right direction of the outboard motor 1. Therefore, for example, when the outboard motor 1 is laid sideways on the ground, the reinforcing frame 92 comes into contact with the ground. Accordingly, the upper portion of the outboard motor 1 is supported by the reinforcing frame 92. Therefore, when the outboard motor 1 is laid sideways on the ground, the engine cover 8 is prevented from being deformed by the weight of the upper portion of the outboard motor 1.

FIG. 20 is a sectional view of the front end portions of the bottom cover 91 and the reinforcing frame 92, along XX-X of FIG. 14. The sectional shape of the reinforcing frame 92 is a substantially cross shape across the entire circumference. The reinforcing frame 92 includes a lower sealing surface 107, an upper sealing surface 109, a lower ridge 110, and an upper ridge 111. The lower ridge 110 and the upper ridge 111 protrude downward and upward, respectively, on the outboard motor inner side of the lower sealing surface 107 and the upper sealing surface 109. The lower sealing surface 107, the upper sealing surface 109, the lower ridge 110, and the upper ridge 111 are continuously formed seamlessly across the entire periphery of the reinforcing frame 92, respectively.

In a state in which the top cover 93 is closed, a sealing member 108 attached to the lower end portion of the top cover 93 is pressed against the upper sealing surface 109 from above. In addition, in a state in which the reinforcing frame 92 is attached to the plurality of members inside the engine cover 8, a sealing member 105 attached to the upper end portion of the bottom cover 91 is pressed against the lower sealing surface 107 from below. Also, as shown in FIG. 14, in a state in which the reinforcing frame 92 is attached to the plurality of members inside the engine cover 8, a sealing member 106 positioned below the reinforcing frame 92 is pressed against the frame supporting bracket 91c from above. Accordingly, entrance of water to the inside of the engine cover 8 is prevented.

Figure 21:
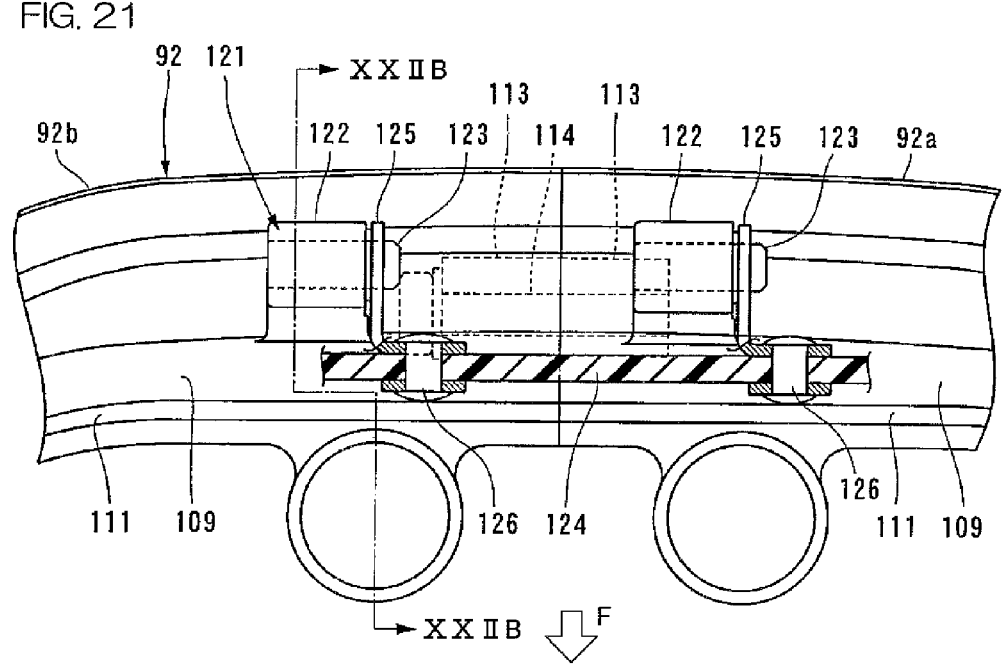
FIG. 21 is an enlarged plan view of a hinge, drawn in a state in which a connection portion connected to the top cover body is cut-away.
Figure 22A:
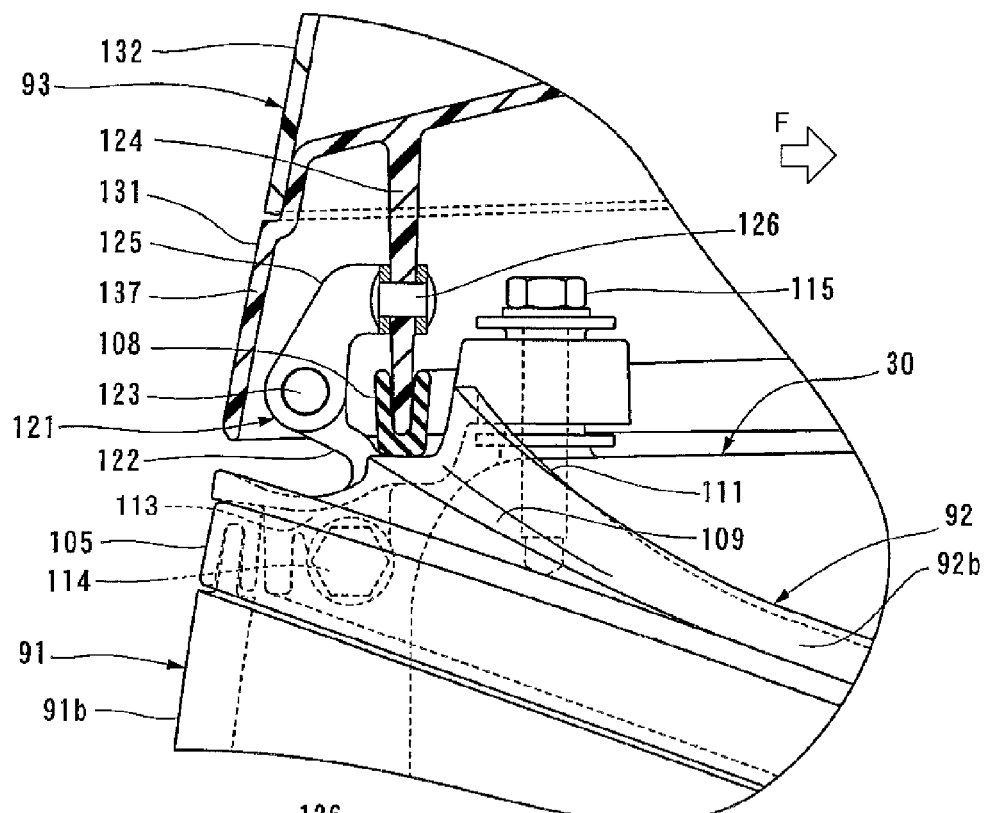
FIG. 22A and FIG. 22B are enlarged views of the hinge.
Figure 22B:
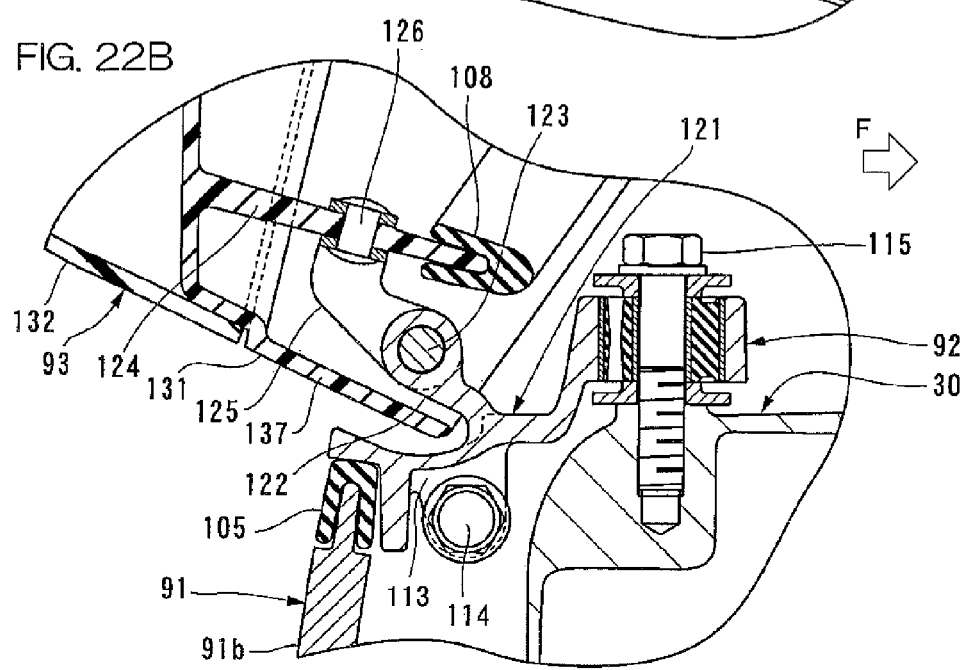

FIG. 21 is an enlarged plan view of a hinge 121, drawn in a state in which a connection portion connected to the top cover body 131 is cut-away. Also, FIG. 22A and FIG. 22B are enlarged views of the hinge 121. At the rear end portion of the reinforcing frame 92, a hinge 121 arranged to support the top cover 93 so as to allow the top cover to open and close (swing up and down) is provided. The hinge 121 includes two supporting brackets 122, two support shafts 123, and two stays 125. The two supporting brackets 122 are molded integrally with the left and right frame bodies 92a and 92b of the reinforcing frame 92. The two supporting brackets 122 project upward from the left and right frame bodies 92a and 92b, respectively. The two support shafts 123 are rotatably supported by the two supporting brackets 122, respectively. The two support shafts 123 are connected to a rear wall 124 of the top cover 93 via two stays 125, respectively.

The supporting brackets 122 are arranged rearward of the upper sealing surface 109 of the reinforcing frame 92 in the outboard motor 1. Also, the support shafts 123 are supported by the corresponding supporting brackets 122 while taking postures along the left-right direction of the outboard motor 1. The two support shafts 123 are arranged on the same axis. As shown in FIG. 21, first end portions of the support shafts 123 project to the outboard motor left side (right side in FIG. 21) from the corresponding support brackets 122. First end portions of the stays 125 are fixed to first end portions of the corresponding support shafts 123. Also, second end portions of the stays 125 are fixed to the rear wall 124 of the top cover 93 by rivets 126, for example.

As shown in FIG. 22A and FIG. 22B, on the rear wall 124 of the top cover 93, a cover 137 is integrally provided. The hinge 121 is covered by the cover 137 from the rear side and both sides in the left-right direction of the outboard motor 1. As shown in FIG. 10, between the right side wall 135 of the top cover 93 and the right end portion of the cover 137, a gap is provided for allowing the sealing member 108 to pass through. In addition, between the left side wall 134 of the top cover 93 and the left end portion of the cover 137, a gap is provided for allowing the sealing member 108 to pass through although this is not shown.

Figure 23:
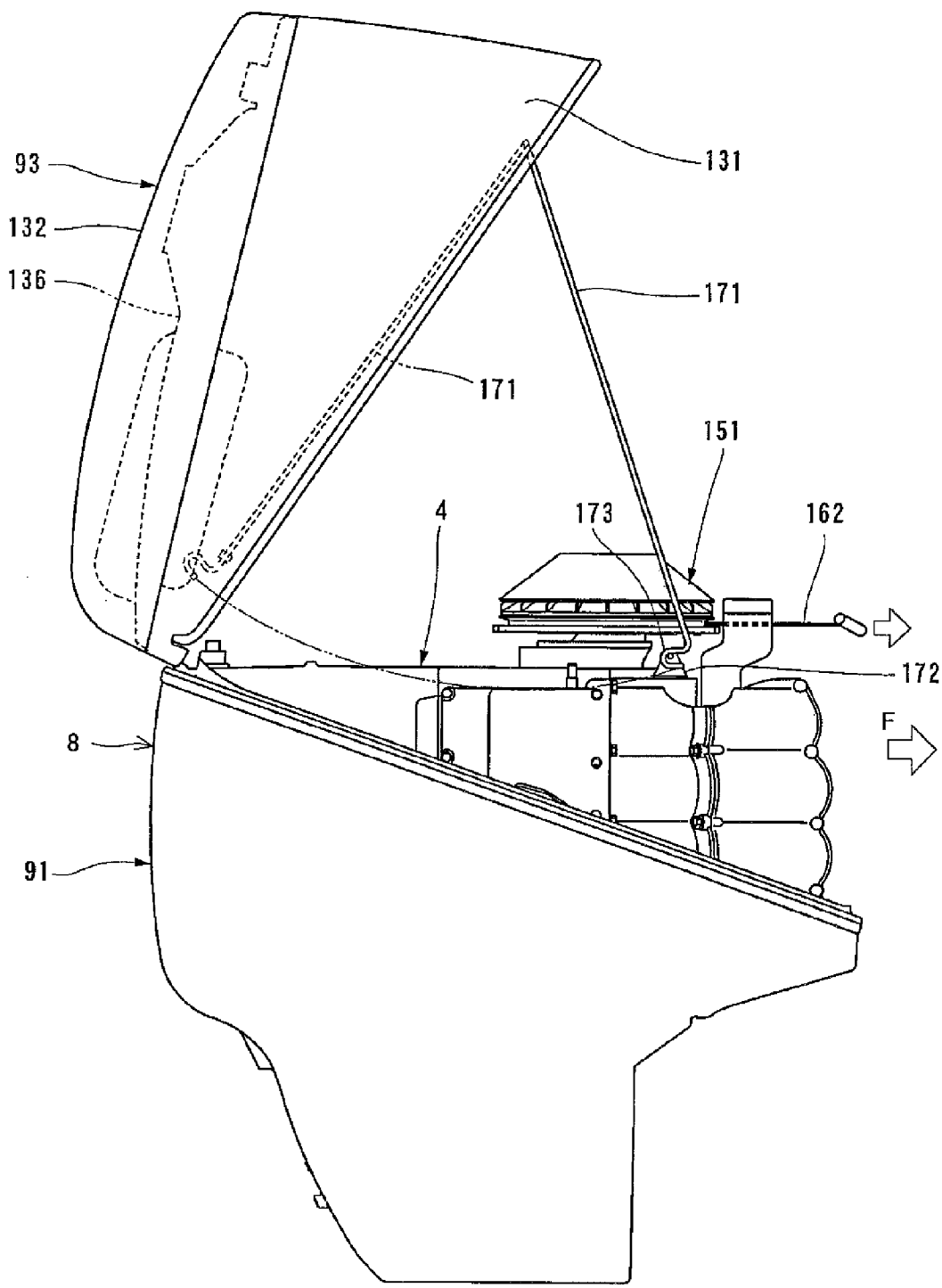
FIG. 23 is a side view of the engine cover in a state in which the top cover is opened.

FIG. 23 is a side view of the engine cover 8 in a state in which the top cover 9 is opened. At the front end portion of the top cover 93 and the front end portion of the bottom cover 91, a lock mechanism not shown is provided. The top cover 93 is kept in a closed state by being locked by the lock mechanism. Also, the top cover 93 is allowed to swing up and down around the support shafts 123 (see FIG. 22A and FIG. 22B) of the hinge 121 by being unlocked by the lock mechanism. Therefore, by unlocking by the lock mechanism, the top cover 93 can be opened and closed.

Also, the top cover 93 includes a rod 171. One end portion of the rod 171 is attached to the top cover 93. Also, on the other end portion of the rod 171, a hook 173 is provided. The rod 171 can swing between an accommodated position shown by a dashed line and a support position shown by a solid line in FIG. 23, around a pivot at one end portion of the rod 171. By positioning the rod 171 at the support position while the top cover 93 is opened, the hook 173 can be engaged with a holder 172 provided on the engine 4 side. Accordingly, by supporting the top cover 93 by the rod 171, the state in which the top cover 93 is opened can be kept. By opening the top cover 93, all components inside the engine cover 8 including the engine 4 are exposed. Therefore, in this state, simple maintenance can be performed.

Figure 24:
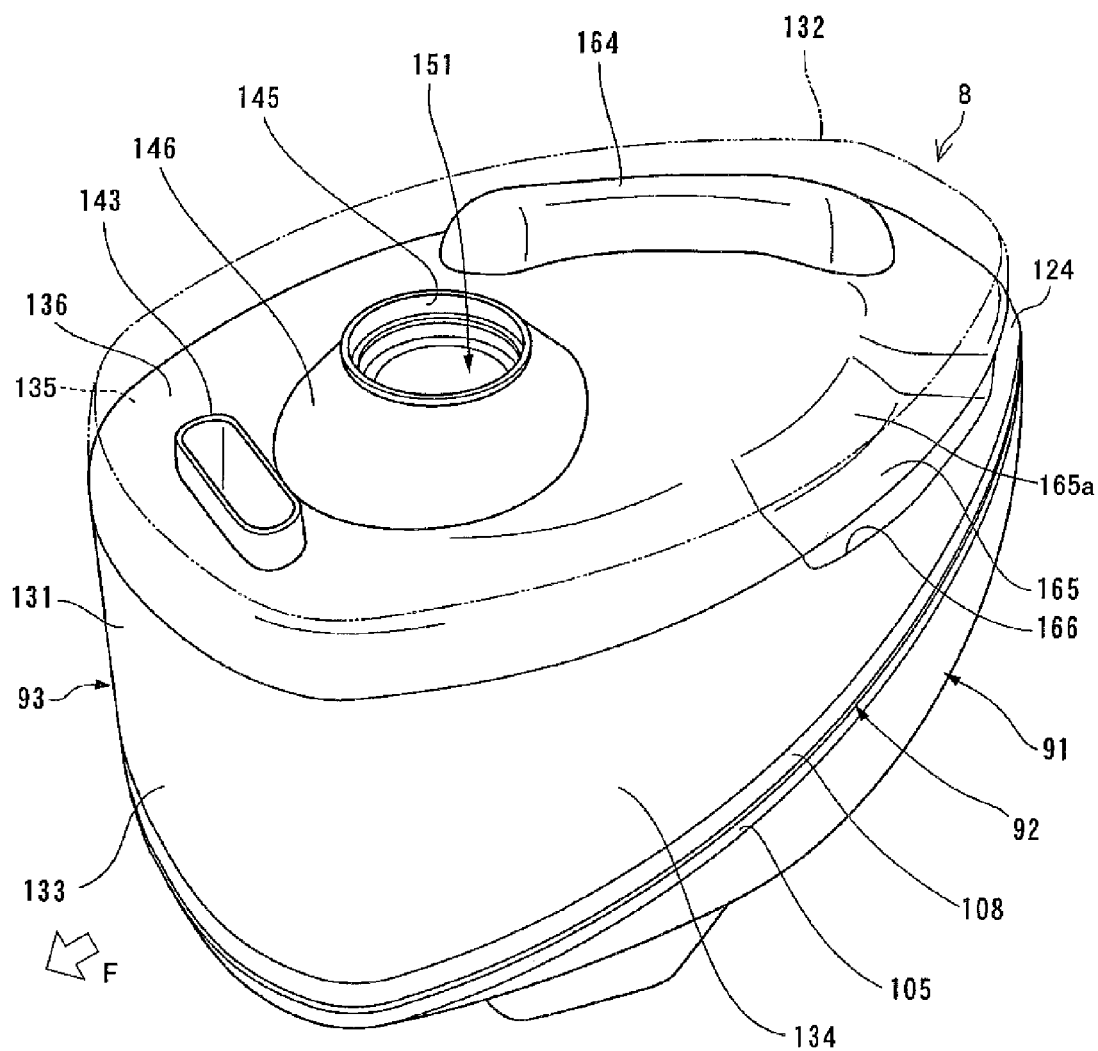
FIG. 24 is a perspective view of the engine cover from the left front upper side, drawn through the cover.
Figure 25:
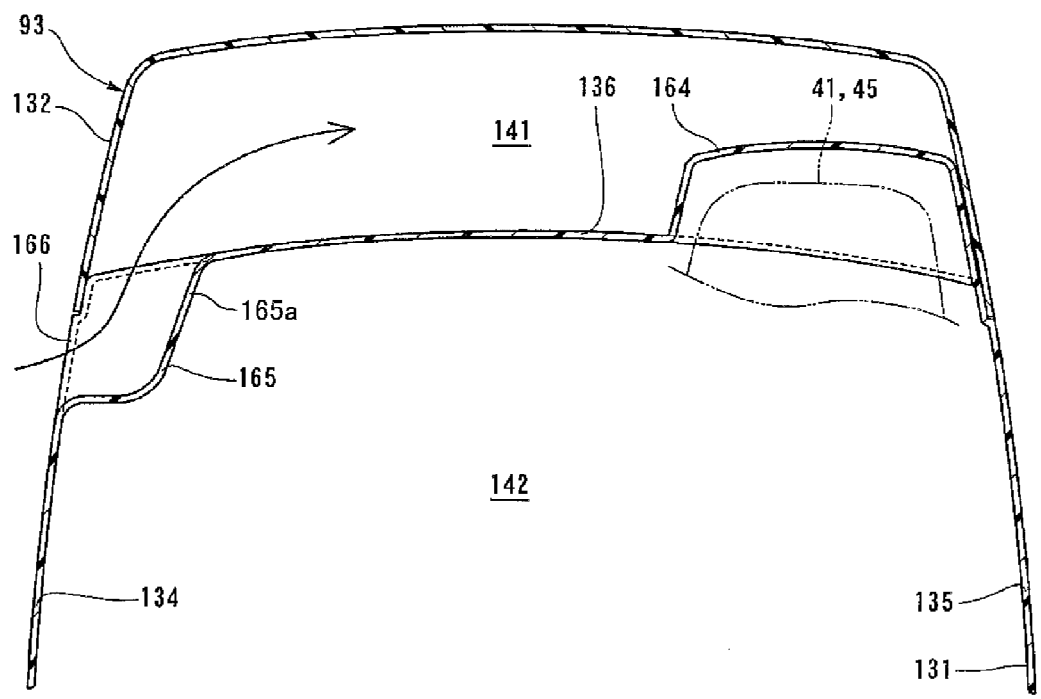
FIG. 25 is a sectional view of the engine cover, along XXV-XXV of FIG. 10.

FIG. 24 is a perspective view of the engine cover 8 from the left front upper side, drawn through the cover 132. The top cover 93 includes a top cover body 131 and a cover 132 attached to an upper end portion of the top cover body 131. The top cover body 131 and the cover 132 are preferably made of plastic, respectively. The top cover body 131 and the cover 132 have box shapes opened downward, respectively.

The cover 132 is fixed to the upper end portion of the top cover body 131 from above while being covered on the upper end portion. As shown in FIG. 1, the top cover 93 covers the upper side of the engine 4. Further, the top cover 93 covers the surrounding of the engine 4 in cooperation with the bottom cover 91.

As shown in FIG. 24, the top cover body 131 includes a front wall 133, a left side wall 134, a right side wall 135, a rear wall 124, and an upper wall 136. The front wall 133 and the rear wall 124 are positioned on the outboard motor front side and rear side of the top cover body 131, respectively. Also, the left side wall 134 and the right side wall 135 are positioned on the outboard motor left side and right side of the top cover body 131, respectively. The upper wall 136 is connected to upper end portions of these walls 133, 134, 135, and 124. The front wall 133, the left side wall 134, the right side wall 135, the rear wall 124, and the upper wall 136 are molded integrally.

Lower end edges of the front wall 133, the left side wall 134, and the right side wall 135 are arranged so as to slope rearward and upward like the reinforcing frame 92. The sealing member 108 is attached to these lower end edges. Accordingly, entrance of water into the inside of the engine cover 8 from the portion between the top cover body 131 and the reinforcing frame 92 is prevented in a state in which the top cover 93 is closed.

Also, on the upper wall 136, a mountain-shaped protrusion 146 positioned on the front end portion side of the upper wall 136 is provided. Further, on the upper wall 136, a protrusion 164 and a recess 165 positioned at the rear end portion side of the upper wall 136 are provided. The protrusion 146, the protrusion 164, and the recess 165 project upward or downward from portions of the upper wall 136. The protrusion 146 is arranged at a central portion in the left-right direction of the outboard motor 1 on the front end portion side of the upper wall 136. A tubular communication duct 143 attached to the front end portion of the upper wall 136 is positioned forward of the protrusion 146. The communication duct 143 is arranged near the protrusion 146. Also, the protrusion 164 and the recess 165 are arranged on the outboard motor right side and the outboard motor left side of the rear end portion side of the upper wall 136.

The protrusion 146 has a tubular shape. The height of the protrusion 146 is higher than that of the communication duct 143. The protrusion 146 preferably has a circular truncated cone shape tapered upward, respectively. At the upper end portion of the protrusion 146, a communication hole 145 which causes the upper side to communicate with the lower side of the upper wall 136 is provided. The opening area of the communication hole 145 is larger than the opening area of the air outlet (sum of the opening area of the cooling air main discharge port 88 and the opening area of the cooling air auxiliary discharge port 104).

The protrusion 146 is positioned between the communication duct 143 and the recess 165. Also, the protrusion 146 is arranged so as to overlap the crankshaft 11 in a plan view when the top cover 93 is closed. Inside the protrusion 146, a blast fan 151 is inserted from below (see FIG. 10).

On the other hand, the protrusion 164 extends in the front-rear direction of the outboard motor 1 along an outer peripheral portion of the upper wall 136 at a rear right portion of the upper wall 136. The protrusion 164 is arranged at a position opposed to the downstream side horizontal portion 41 and the throttle valve 45 of the intake duct 31 from above in a state in which the top cover 93 is closed. The protrusion 164 is arranged such that the downstream side horizontal portion 41 and the throttle valve 45, and the upper wall 136 do not interfere with each other in a state in which the top cover 93 is closed (see FIG. 25).

The recess 165 is arranged along an outer peripheral portion of the upper wall 136 at a rear left portion of the upper wall 136. On the bottom surface of the recess 165, a slope portion 165a which lowers outward is provided (see FIG. 24 and FIG. 25). The bottom surface of the recess 165 is joined to an upper end portion of the left side wall 134. The portion to which the recess 165 is joined at the upper end portion of the left side wall 134 is lower than other portions at the upper end portion of the left side wall 134. The lower end portion of the cover 132 is fixed to the upper end portion of the top cover body 131 while being in close contact with the upper end portion except for the portion opposed to the recess 165. Therefore, a gap corresponding to the air inlet 166 is provided between the rear left portion of the cover 132 and the upper end rear portion of the left side wall 134. The space between the upper wall 136 and the cover 132 communicates with the outside of the engine cover 8 via the air inlet 166.

Figure 26:
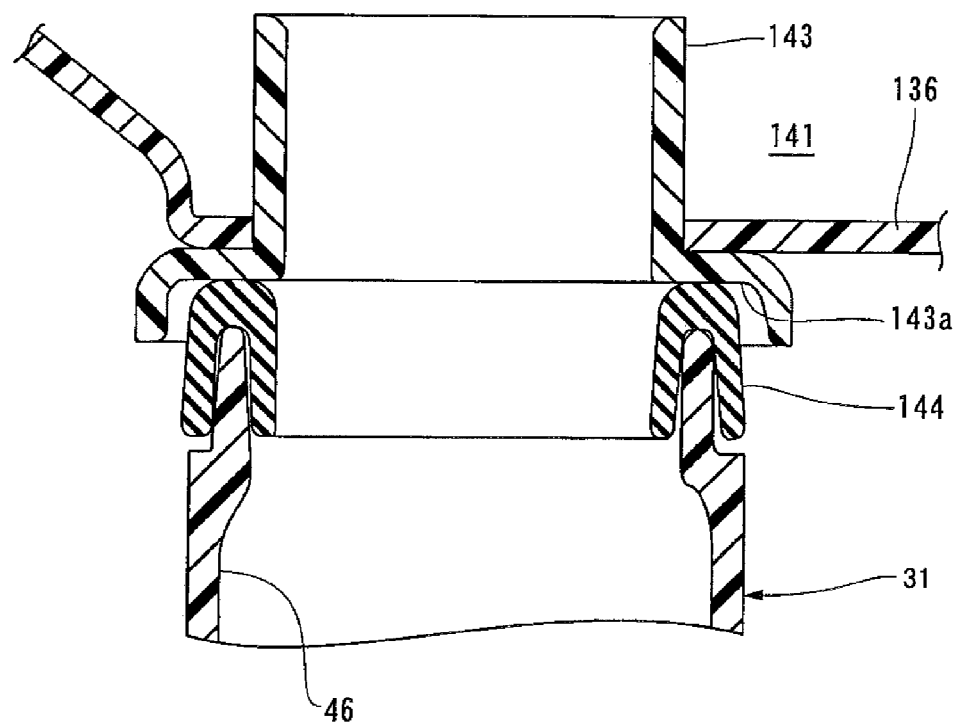
FIG. 26 is an enlarged sectional view of a connection portion between a communication duct and an intake duct.

The communication duct 143 is attached to the front end portion of the upper wall 136 while taking a vertical posture penetrating through the upper wall 136 in the up-down direction. The communication duct 143 causes the upper side to communicate with the lower side of the upper wall 136. The communication duct 143 preferably has a shape equivalent to that of the air suction port 46 in a plan view. An opening is provided at the upper end of the communication duct 143. As shown in FIG. 1, this opening is positioned higher than the air inlet 166. In addition, as shown in FIG. 26, the communication duct 143 is arranged at a position opposed to the air suction port 46 of the intake duct 31 from above in a state in which the top cover 93 is closed.

At the lower end portion of the communication duct 143, a flat connection surface 143a arranged to connect the air suction port 46 is provided. Also, to the upper end portion of the air suction port 46, a sealing member 144 is attached. The connection surface 143a is pressed against the sealing member 144 from above in a state in which the top cover 93 is closed. Accordingly, the communication duct 143 is connected to the air suction port 46.

In the present preferred embodiment of the present invention, the upper wall 136 defines a partitioning member. Specifically, as shown in FIG. 10, in a state in which the top cover 93 is closed, the inside of the engine cover 8 is partitioned vertically into an upper chamber 141 and a lower chamber 142 by the upper wall 136. The upper chamber 141 is arranged between the upper wall 136 and the cover 132. Also, the lower chamber 142 is arranged inside the top cover body 131 and the bottom cover 91. The engine 4 is accommodated in the lower chamber 142.

The upper chamber 141 communicates with the outside of the engine cover 8 via the air inlet 166. Also, the lower chamber 142 communicates with the outside of the engine cover 8 via the air outlets 88 and 104. In a state in which the top cover 93 is closed, the upper chamber 141 communicates with the lower chamber 142 via the communication hole 145. Further, when the top cover 93 is closed and the communication duct 143 is connected to the air suction port 46, the air suction port 46 communicates with the upper chamber 141. Therefore, when the top cover 93 is closed, the air suction port 46 opens substantially at the front end portion inside the upper chamber 141.

As described above, the lower end portion of the cover 132 is fixed to the upper end portion of the top cover body 131 while being in close contact with the upper end portion. Therefore, the upper chamber 141 is arranged as a substantially airtight space. Also, as described above, the gaps between the components of the bottom cover 91 (the left and right cover bodies 91a and 91b and the frame supporting bracket 91c) are sealed. Further, the portions between the cover bodies 91a and 91b and the members positioned inside the cover bodies are sealed. Further, when the top cover 93 is closed, the portion between the bottom cover 91 and the reinforcing frame 92 and the portion between the top cover 93 and the reinforcing frame 92 are sealed by the sealing member 105 and the sealing member 108, respectively. Therefore, the lower chamber 142 is arranged as a substantially airtight space.

Figure 27:
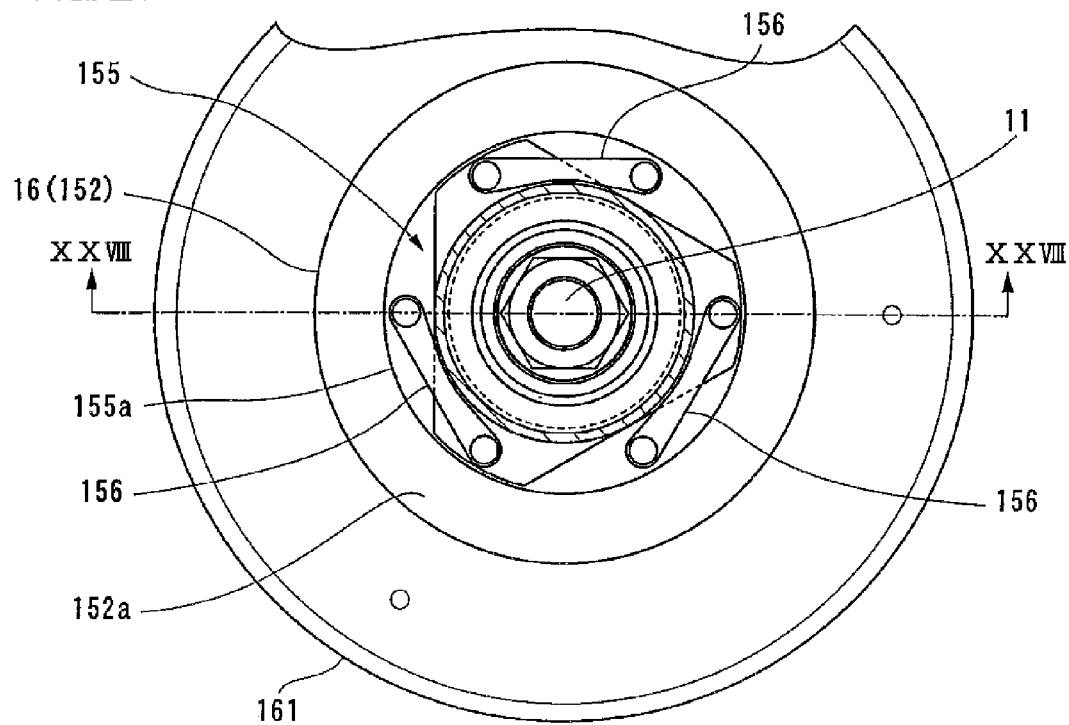
FIG. 27 is a plan view of a fan, drawn in a state in which a portion of an impeller is cut-away.
Figure 28:
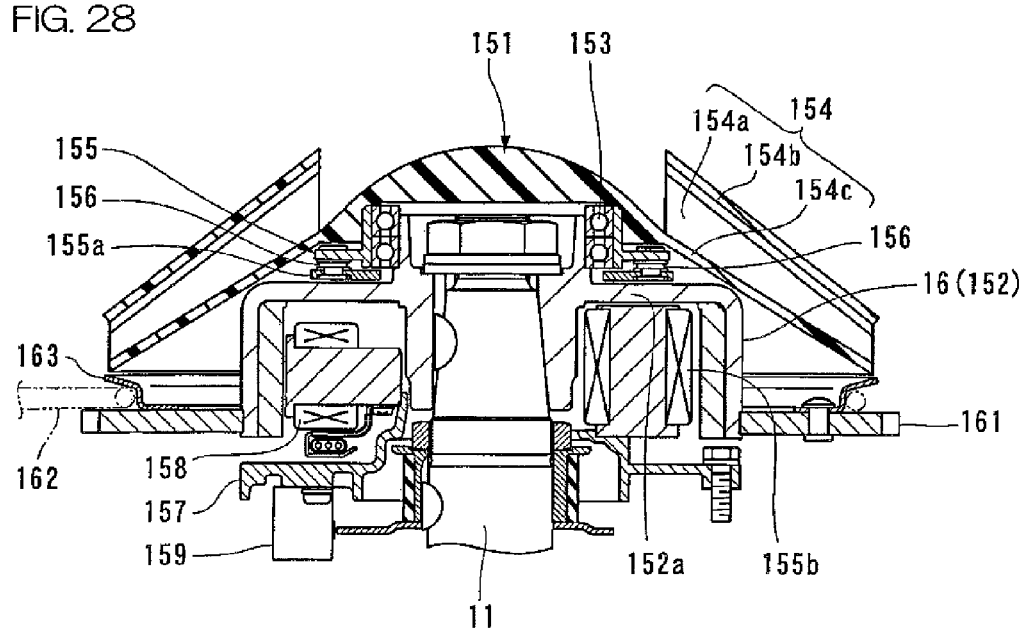
FIG. 28 is a sectional view along XXVIII-XXVIII of FIG. 27.

FIG. 27 is a plan view of the fan 151, drawn in a state in which a portion of the impeller 154 is cut-away. FIG. 28 is a sectional view along XXVIII-XXVIII of FIG. 27. The fan 151 is a centrifugal fan in the present preferred embodiment of the present invention. The fan 151 includes the impeller 154 and a solenoid clutch 155. The impeller 154 is supported rotatably by a rotor 152 of a flywheel magneto 16 via a bearing 153. The rotor 152 is fixed to the crankshaft 11. The solenoid clutch 155 can join the rotor 152 and the impeller 154 to each other so as to allow these to rotate integrally. Therefore, by connecting and disconnecting the solenoid clutch 155, rotation of the rotor 152 (rotation of the crankshaft 11) can be selectively transmitted to the impeller 154. The impeller 154 and the crankshaft 11 are arranged on the same axis. When the solenoid clutch 155 is disconnected, the impeller 154 can rotate relative to the crankshaft 11.

The impeller 154 includes a plurality of blades 154a and two disks 154b and 154c. The plurality of blades 154a are arranged between the two disks 154b and 154c. The impeller 154 supports an armature 155a of the solenoid clutch 155 via three leaf springs 156. The armature 155a is held between the disk 154c of the impeller 154 and a disk portion 152a of the rotor 152 while being suspended by the three leaf springs 156. The armature 155a is made of a magnetic material so as to have a ring shape.

The solenoid clutch 155 includes the armature 155a and an exciting coil 155a. The exciting coil 155b is supported and fixed to a magneto base 157 of the flywheel magneto 16. The exciting coil 155b is inserted into the inside of the rotor 152 from below. The magnetic pole of the exciting coil 155b is positioned near the lower side of the disk portion 152a of the rotor 152. The magnetic pole of the exciting coil 155b is opposed to the lower surface of the disk portion 152a via a small gap. The magneto base 157 is fixed to the engine 4. The magneto base 157 supports an ignition coil 158 and an ignition pulsar 159 in addition to the exciting coil 155b.

The exciting coil 155b is electrically connected to a control device (not shown) of the engine 4. The exciting coil 155b is switched to be ON/OFF by this control device. The armature 155a is adsorbed to the disk portion 152a of the rotor 152 by magnetism against resilient forces of the leaf springs 156 by excitation of the exciting coil 55b. By adsorbing the armature 155a by the rotor 152, the rotation of the rotor 152 is transmitted to the impeller 154 via the armature 155a and the leaf springs 156. Accordingly, the impeller 154 and the rotor 152 rotate integrally. In a state in which the top cover 93 is closed, when the impeller 154 rotates, air inside the upper chamber 141 is suctioned into the impeller 154 through the communication hole 145 and supplied into the lower chamber 142.

Also, on the outer peripheral portion of the rotor 152, a starter ring gear 161 is provided. Between the ring gear 161 and the outer peripheral portion of the impeller 154, a starter pulley 163 is provided. The starter ring gear 161 is rotated by a starter motor (not shown) when the engine starts. Also, the starter pulley 163 is for winding a starter rope 162. As shown in FIG. 23, in a state in which the top cover 93 is opened, by pulling the starter rope 162 wound around the starter pulley 163, for example, forward of the outboard motor 1, the engine 4 can be manually started.

When the fan 151 is driven to rotate in a state in which the top cover 93 is closed, air inside the upper chamber 141 is sent into the lower chamber 142 through the communication hole 145. In addition, the atmosphere is taken into the upper chamber 141 through the air inlet 166. Also, the air sent into the lower chamber 142 through the communication hole 145 flows down to the lower portion of the lower chamber 142 through the surrounding of the engine 4. Then, this air is discharged to the outside of the engine cover 8 from the air outlets (the cooling air main discharge port 88 and the cooling air auxiliary discharge port 104). As described above, the opening area of the air discharge port is arranged to be smaller than the opening area of the communication hole 145. Therefore, by sending air from the upper chamber 141 into the lower chamber 142 through the communication hole 145, the inside of the lower chamber 142 is kept at a positive pressure higher than the atmospheric pressure.

Technical effects and advantages of the outboard motor 1 of the present preferred embodiment of the present invention are as follows.

The inside of the engine cover 8 is vertically partitioned into the upper chamber 141 and the lower chamber 142 by the upper wall 136. The engine 4 is accommodated in the lower chamber 142. Therefore, the heat of the engine 4 is blocked by the upper wall 136 and this makes it difficult to transmit heat to the upper chamber 141. Further, by the rotation of the fan 151 when operating the engine, air flows down inside the lower chamber 142. Therefore, it is more difficult for the heat of the engine 4 to transmit to the upper chamber 141. Therefore, a temperature increase in the air inside the upper chamber 141 is suppressed or prevented. Therefore, the temperature of the air inside the upper chamber 141 is kept equivalent to the temperature of the atmosphere.

Air inside the upper chamber 141 is supplied to the engine 4 via the intake duct 31. Therefore, the temperature of intake air in the engine 4 is equivalent to that of the atmosphere. Therefore, the temperature of intake air can be made lower than in conventional outboard motors. Also, by lowering the intake air temperature, an occurrence of knocking can be suppressed or prevented without delaying the ignition timing in the engine 4.

Also, a portion of the air inside the upper chamber 141 is sent into the lower chamber 142 by the fan 151. This air becomes a cooling air and flows around the engine 4 toward the cooling air main discharge port 88 and the cooling air auxiliary discharge port 104. Also, the temperature of the air to be sent into the lower chamber 142 by the fan 151 is equivalent to the temperature of the atmosphere. Therefore, by the flow of the cooling air inside the lower chamber 142, the engine 4, the first to third exhaust pipes 55 to 57, and the exhaust chamber 58, and heating components such as electronic components installed in the lower chamber 142 can be efficiently cooled.

Water is splashed when a marine vessel including the outboard motor 1 runs. The splashed water may enter the inside of the upper chamber 141 from the air inlet 166. Also, water which entered the inside of the upper chamber 141 flows along the upper wall 136 of the top cover body 131 or floats in the form of mist inside the upper chamber 141.

In the present preferred embodiment of the present invention, when the top cover 93 is closed, the air suction port 46 of the intake duct 31 communicates with the upper chamber 141. In other words, when the top cover 93 is closed, the air suction port 46 communicates with a position higher than the engine 4 inside the engine cover 8. Also, the opening at the upper end of the communication duct 143 is positioned higher than the upper wall 136. Therefore, water flowing on the upper wall 136 is rarely suctioned into the opening at the upper end of the communication duct 143. Further, the opening at the upper end of the communication duct 143 is positioned higher than the air inlet 166. Therefore, water which has entered the inside of the upper chamber 141 from the air inlet 166 falls down onto the upper wall 136 on the way to the upper end of the communication duct 143. Therefore, water is rarely suctioned into the intake duct 31.

Further, between the communication duct 143 and the air inlet 166, the protrusion 146 is positioned. Therefore, water flowing on the upper wall 136 toward the communication duct 143 is blocked by the protrusion 146. Therefore, the amount of water to be suctioned from the opening at the upper end of the communication duct 143 is reduced. Further, the protrusion 146 is positioned near the communication duct 143, such that the water which approaches the communication duct 143 is reliably blocked. Therefore, the amount of water to be suctioned from the opening at the upper end of the communication duct 143 is further reduced. Therefore, water flowing on the upper wall 136 enters the inside of the recess 165 provided on the upper wall 136, and is discharged from the air inlet 166 due to the slope of the slope portion 165a provided on the bottom surface of the recess 165. Accordingly, a portion of water which entered the upper chamber 141 is discharged.

Also, in the present preferred embodiment of the present invention, a portion of air inside the upper chamber 141 is sent into the lower chamber 142 by the fan 151. Therefore, water in the form of mist which is pushed and moved by the air of the water which entered the upper chamber 141 is sent into the lower chamber 142 together with air by the fan 151. In other words, a portion of the water in the form of mist inside the upper chamber 141 is discharged to the lower chamber 142 by the fan 151. Also, the water which entered the lower chamber 142 falls down or flows down inside the lower chamber 142 and discharged to the outside of the engine cover 8 from the cooling air main discharge port 88 or the cooling air auxiliary discharge port 104 positioned at the lower portion of the lower chamber 142.

Thus, in the present preferred embodiment of the present invention, the amount of water to be suctioned from the opening at the upper end of the communication duct 143 is small. Water flowing on the upper wall 136 is discharged from the air inlet 166 due to the slope of the slope portion 165a provided on the bottom surface of the recess 165. Further, water in the form of mist inside the upper chamber 141 is discharged by the fan 151. Therefore, water to be suctioned by the intake device 32 of the engine 4 can be reduced. Accordingly, water to be suctioned by the engine 4 can be reduced.

In the present preferred embodiment of the present invention, the intake device 32 of the outboard motor 1 has the intake duct 31 having a U-shaped or substantially U-shaped configuration in a side view. At the pair of upper end portions of the intake duct 31, the air suction port 46 and the throttle valve 45 are positioned, respectively. Also, the bottom portion of the intake duct 31 is positioned at substantially the same height as the lower end portion of the engine 4. Therefore, even if water which entered the inside of the upper chamber 141 is suctioned into the intake duct 31 together with intake air, the intake air containing this water flows down from the air suction port 46 and collides with the bottom of the intake duct 31 or walls around the bottom. Then, the intake air including water turns around and rises on the downstream side of the intake duct 31. Therefore, water contained in the intake air is attached to the bottom of the intake duct 31 or walls around the bottom. Therefore, the amount of water contained in the intake air is reduced to a degree which causes no problem with the engine 4.

In the present preferred embodiment of the present invention, the vapor separator tank 48 including the fuel supply float chamber 48a and the high-pressure fuel pump 48b is provided inside the intake duct 31. Therefore, a heat insulating layer is formed by an air layer around the float chamber 48a and the high-pressure fuel pump 48b. Therefore, it is difficult for the heat of the engine 4 to transmit to the fuel inside the float chamber 48a and the high-pressure fuel pump 48b. Also, the evaporated gas of the fuel (vapor of fuel) generated inside the float chamber 48a and the high-pressure fuel pump 48b flows out into the intake duct 31. Therefore, the evaporated gas can be suctioned into the engine 4 together with the intake air. Accordingly, the fuel can be used without waste.

In the present preferred embodiment of the present invention, a suction passage including the drainage pipe 50 and the coolant discharge passage 52 is connected to the lowest portion of the intake duct 31 via the check valve 51. This suction passage communicates with the suck-out port 53 positioned on the upstream side of the propeller 7. Therefore, when a marine vessel including the outboard motor 1 runs, a suctioning force toward the suck-out port 53 is generated inside the suction passage due to a negative pressure generated near the upstream side of the propeller 7. Therefore, water which has flowed down to the bottom of the intake duct 31 is discharged to the outside of the outboard motor 1 when the marine vessel including the outboard motor 1 runs.

Also, in the present preferred embodiment of the present invention, the outboard motor 1 includes the fan 151. The fan 151 includes the impeller 154 and the solenoid clutch 155. The impeller 154 is arranged at the same axis as the crankshaft 11. Further, the impeller 154 is rotatable with respect to the crankshaft 11. To the impeller 154, rotation of the crankshaft 11 is selectively transmitted by the solenoid clutch 155. Therefore, by controlling the solenoid clutch 155 by the control device of the engine 4, the fan 151 can be switched to rotate/stop as appropriate.

Specifically, for example, during operation at a high speed (high speed of the engine 4) etc., in an operation state in which the load on a fan 151 becomes excessive, the solenoid clutch 155 may be switched in a disconnected state. In this case, the load on the engine 4 is reduced during operation at a high speed and fuel consumption can be improved.

Also, when engine 4 requires a high output at a suddenly-accelerated time, etc., the solenoid clutch 155 may be switched in a disconnected state. In this case, a load on the engine 4 is reduced at a suddenly-accelerated time and output can be improved.

Further, the fan 151 may be switched to rotate/stop according to the temperature of the lower chamber 142. For example, when the temperature of the lower chamber 142 reaches a predetermined temperature, the solenoid clutch 155 is connected to rotate the fan 151. When the temperature of the lower chamber 142 becomes lower than the set temperature, the solenoid clutch 155 is disconnected to cut off the power of the engine 4 to be transmitted to the fan 151. Accordingly, power loss due to driving of the fan 151 is eliminated, and the fuel consumption can be improved.

Also, in the present preferred embodiment of the present invention, when air is sent into the lower chamber 142 by the fan 151, the pressure inside the lower chamber 142 becomes higher than the atmospheric pressure. Therefore, when the fan 151 is actuated, it is difficult for water to enter the lower chamber 142 from the outside of the engine cover 8. Therefore, entrance of water into the lower chamber 142 can be reliably prevented by sealing with a comparatively simple structure.

In detail, when the pressure inside the lower chamber 142 becomes negative, an intake air pressure is applied to the sealing portion of the engine cover 8 and the top cover body 131. Therefore, when the pressure inside the lower chamber 142 becomes negative, a strong sealing material that is resistant to the intake air pressure must be used. Also, when the pressure inside the lower chamber 142 becomes negative, a top cover body 131 which has high rigidity so as not to be deformed by the intake air pressure must be used. For example, a top cover body 131 made of a metal such as an aluminum alloy must be used.

On the other hand, when the pressure inside the lower chamber 142 becomes positive, the intake air pressure is not applied to the sealing portion of the engine cover 8. Therefore, a strong sealing material that is resistant to the intake air pressure is not required to be used. Therefore, as in the case of the present preferred embodiment of the present invention, even in a configuration in which the top cover 93 can be opened and closed and sealing is needed in a wide range, entrance of water into the lower chamber 142 can be reliably prevented by sealing with a comparatively simple structure.

Also, when the pressure inside the lower chamber 142 becomes positive, the intake air pressure is not applied to the top cover body 131. Therefore, a top cover body 131 with high rigidity is not necessary to be used. Therefore, a top cover body 131 made of a light-weight material such as plastic can be used. Accordingly, the engine cover 8 can be made lighter in weight. Also, when the top cover body 131 is made of plastic, the rigidity is lower than in the case in which it is made of an aluminum alloy. However, sufficient rigidity is secured for the reinforcing frame 92, such that sufficient rigidity of the engine cover 8 can be secured as a whole.

As described above, from the cooling air main discharge port 88 and the cooling air auxiliary discharge port 104, water which entered the inside of the engine cover 8 is discharged together with the air which cooled the engine cover 8. Therefore, when the outboard motor 1 is used at sea, salt is contained in the water to be discharged from the cooling air main discharge port 88 and the cooling air auxiliary discharge port 104. This salt may adhere to the rear wall surface of the engine cover 8 and whitely stain a portion of the rear wall surface.

Also, the exhaust pipe 87 of the sound absorbing chamber 86 is inserted into the cooling air main discharge port 88. From the exhaust pipe 87 of the sound absorbing chamber 86, exhaust gas is exhausted during idling of the engine 4. Therefore, during idling of the engine 4, from the cooling air main discharge port 88, the air which cooled the inside of the engine cover 8 and exhaust gas are discharged. Therefore, the exhaust gas may come into contact with the rear wall surface of the engine cover 8 and stain a portion of the rear wall surface by, for example, carbon.

In the present preferred embodiment of the present invention, water containing salt and exhaust gas are discharged from the same location (cooling air main discharge port 88). Therefore, on the rear wall surface of the engine cover 8, a portion which is stained by salt to be white and a portion which is stained by the exhaust gas concentrate at one point. Therefore, an area to be stained on the engine cover 8 is small. Therefore, it is difficult to deteriorate the external appearance of the outboard motor 1, and cleaning becomes easy.

As described above, in the present preferred embodiment of the present invention, the temperature of the intake air of the engine 4 can be lowered. Further, components accommodated in the lower chamber 142 such as the engine 4 can be efficiently cooled. Further, the amount of water to be suctioned into the intake device 32 can be reduced. Therefore, an outboard motor 1 which realizes an intake air temperature decrease, cooling of the engine 4, and reduction in the amount of water to be suctioned into the intake device 32 can be provided.

In the preferred embodiment of the present invention described above, an example in which the fan 151 is driven by the engine 4 is shown; however, the fan 151 may be driven by, for example, an electric motor. In this case, a strong air flow can be formed by a cooling wind inside the engine cover 8 by the fan 151 not only during operation at a high speed but also during operation at a low speed. Therefore, for example, heating electronic components can be properly cooled regardless of the speed of the engine 4.

A detailed description was provided of the preferred embodiments of the present invention. However, the preferred embodiments are only specific examples to describe the technical content of the present invention, and the present invention is not to be construed as limited to these specific examples. The spirit and scope of the present invention are restricted only by the appended claims.

The present application corresponds to Japanese Patent Application No. 2008-229389 filed in the Japan Patent Office on Sep. 8, 2008, and the entire disclosure of the application is incorporated in its entirety herein by reference.

What is claimed is:

1. An outboard motor, comprising:
an engine which is arranged to support a crankshaft extending along an up-down direction;
an engine cover which is arranged to cover the engine; and
a partitioning member which is arranged to partition an inside of the engine cover into a lower chamber accommodating the engine and an upper chamber, the partitioning member having a communication hole arranged to cause the upper chamber to communicate with the lower chamber; wherein
the engine cover has an air inlet which is arranged in an upper portion of the engine cover and is arranged to cause the upper chamber to communicate with the atmosphere, and an air outlet which is arranged at a lower end portion of the engine cover and is arranged to cause the lower chamber to communicate with the atmosphere,
the outboard motor further comprising:
an intake device connected to the engine and including an air suction port arranged to communicate with the upper chamber, and an intake duct which has a substantially U-shaped configuration in a side view and is arranged to distribute air suctioned from the air suction port to the engine;
a fan which is arranged inside the engine cover and is arranged to send air inside the upper chamber into the lower chamber through the communication hole; and
a fuel supply float chamber provided inside the intake duct.

2. The outboard motor according to claim 1, wherein:
the engine cover is arranged to cover an entirety of the engine.

3. The outboard motor according to claim 1, wherein the lower chamber is arranged so as to be kept at a positive pressure higher than the atmospheric pressure when the fan is actuated.

4. The outboard motor according to claim 1, wherein an opening area of the air outlet is smaller than an opening area of the communication hole.

5. The outboard motor according to claim 1, wherein the intake duct includes a pair of upper end portions positioned at the upper portion of the inside of the engine cover, and a bottom portion positioned at the lower end portion of the inside of the engine cover.

6. The outboard motor according to claim 1, further comprising a solenoid clutch which is arranged to selectively transmit rotation of the crankshaft to the fan.

7. The outboard motor according to claim 1, further comprising a communication duct which is arranged to project upward from the partitioning member and has an opening provided at an upper end of the communication duct, the opening being arranged to cause the upper chamber to communicate with the air suction port.

8. The outboard motor according to claim 7, further comprising a protrusion which is positioned between the communication duct and the air inlet and is arranged to protrude upward from the partitioning member.

9. The outboard motor according to claim 8, wherein the protrusion is arranged near the communication duct.

10. The outboard motor according to claim 1, wherein the partitioning member includes a slope portion which is arranged to slope so as to lead water entering the upper chamber to the air inlet.

11. The outboard motor according to claim 1, wherein the air suction port is arranged at a position higher than the engine inside the engine cover.

12. The outboard motor according to claim 1, wherein a lowermost end portion of the engine cover extends below a lowermost end portion of the engine.

13. An outboard motor, comprising:
   an engine which is arranged to support a crankshaft extending along an up-down direction;
   an engine cover which is arranged to cover the engine; and
   a partitioning member which is arranged to partition an inside of the engine cover into a lower chamber accommodating the engine and an upper chamber, the partitioning member having a communication hole arranged to cause the upper chamber to communicate with the lower chamber; wherein
   the engine cover has an air inlet which is arranged in an upper portion of the engine cover and is arranged to cause the upper chamber to communicate with the atmosphere, and an air outlet which is arranged at a lower end portion of the engine cover and is arranged to cause the lower chamber to communicate with the atmosphere,
   the outboard motor further comprising:
      an intake device connected to the engine and including an air suction port arranged to communicate with the upper chamber, and an intake duct which has a substantially U-shaped configuration in a side view and is arranged to distribute air suctioned from the air suction port to the engine;
      a fan which is arranged inside the engine cover and is arranged to send air inside the upper chamber into the lower chamber through the communication hole;
      a suction passage which is connected to a lowest portion of the intake duct via a check valve; and
      a suck-out port which is arranged to communicate with the suction passage, and is arranged at a position at which a suctioning force acts when a marine vessel including the outboard motor runs.

14. The outboard motor according to claim 13, further comprising a propeller which is arranged to generate a propulsive force, wherein
   the suck-out port is arranged at a position at which a negative pressure lower than an atmospheric pressure is generated due to a water current generated by rotation of the propeller.

* * * * *